US012012322B2

(12) United States Patent
Rushton et al.

(10) Patent No.: US 12,012,322 B2
(45) Date of Patent: *Jun. 18, 2024

(54) WORKING MACHINE

(71) Applicant: J.C. BAMFORD EXCAVATORS LIMITED, Uttoxeter (GB)

(72) Inventors: Tom Rushton, Uttoxeter (GB); Richard Brooks, Uttoxeter (GB)

(73) Assignee: J.C. BAMFORD EXCAVATORS LIMITED, Uttoxeter (GB)

( * ) Notice: Subject to any disclaimer, the term of this patent is extended or adjusted under 35 U.S.C. 154(b) by 1104 days.

This patent is subject to a terminal disclaimer.

(21) Appl. No.: 16/806,950

(22) Filed: Mar. 2, 2020

(65) Prior Publication Data
US 2020/0277176 A1 Sep. 3, 2020

(30) Foreign Application Priority Data
Mar. 1, 2019 (GB) ...................................... 1902826

(51) Int. Cl.
*B66F 9/24* (2006.01)
*B60L 50/60* (2019.01)
(Continued)

(52) U.S. Cl.
CPC ................ *B66F 9/24* (2013.01); *B60L 50/60* (2019.02); *B66F 9/0655* (2013.01);
(Continued)

(58) Field of Classification Search
CPC .. B60L 50/60; B60L 2200/40; B60L 2200/42; B66F 9/0655; B66F 9/07504;
(Continued)

(56) References Cited

U.S. PATENT DOCUMENTS 4,026,378 A 5/1977 DePriester
4,573,319 A 3/1986 Chichester
(Continued)

FOREIGN PATENT DOCUMENTS

AT 405780 B 11/1999
CN 2297437 Y 11/1998
(Continued)

OTHER PUBLICATIONS

Guetschow, EP2700611, machine translation. Feb. 26, 2014 (Year: 2014).*

(Continued)

*Primary Examiner* — Hung Q Nguyen
*Assistant Examiner* — Mark L. Greene
(74) *Attorney, Agent, or Firm* — MARSHALL, GERSTEIN & BORUN LLP

(57) ABSTRACT

A control system for use with a working machine is provided, the working machine including a machine body, and a load handling apparatus coupled to the machine body and moveable by a movement actuator with respect to the machine body, the working machine being configured for use with at least one electric energy storage module. The control system includes a controller configured to: receive or acquire information representative of an attribute of said electric energy storage module; determine permitted and/or prohibited operations of the working machine based on the received or acquired information; and issue an operations signal for use by at least one element of the working machine corresponding to the determined permitted and/or prohibited operations.

24 Claims, 12 Drawing Sheets

(51) Int. Cl.
*B66F 9/065* (2006.01)
*B66F 9/075* (2006.01)
*B66F 17/00* (2006.01)

(52) U.S. Cl.
CPC ........ *B66F 9/07504* (2013.01); *B66F 9/0755* (2013.01); *B66F 9/07554* (2013.01); *B66F 9/07559* (2013.01); *B66F 9/0759* (2013.01); *B66F 17/003* (2013.01); *B60L 2200/42* (2013.01)

(58) Field of Classification Search
CPC ................ B66F 9/0755; B66F 9/07554; B66F 9/07559; B66F 9/0759; B66F 9/24; B66F 17/00; B66F 17/003
See application file for complete search history.

(56) References Cited

U.S. PATENT DOCUMENTS

| | | | |
|---|---|---|---|
| 5,919,109 | A | 7/1999 | Fleckenstein |
| 5,921,338 | A | 7/1999 | Edmondson |
| 6,134,816 | A | 10/2000 | Murakami et al. |
| 6,688,481 | B1 | 2/2004 | Adner et al. |
| 8,443,943 | B2 * | 5/2013 | McCabe ................ B60L 50/60 320/132 |
| 8,807,910 | B1 * | 8/2014 | Roden ...................... E02F 9/18 414/673 |
| 9,073,739 | B2 | 7/2015 | Woods et al. |
| 9,248,731 | B2 | 2/2016 | Soma'et al. |
| 9,540,788 | B2 | 1/2017 | Naito |
| 9,550,659 | B2 | 1/2017 | Nakazawa et al. |
| 2002/0148144 | A1 | 10/2002 | Tokunaga |
| 2003/0095857 | A1 | 5/2003 | Degelman |
| 2005/0216105 | A1 | 9/2005 | Tabor |
| 2009/0283346 | A1 | 11/2009 | Katae et al. |
| 2012/0039696 | A1 | 2/2012 | Brooks et al. |
| 2012/0279938 | A1 | 11/2012 | Benton et al. |
| 2013/0049404 | A1 | 2/2013 | Uesugi |
| 2013/0071212 | A1 | 3/2013 | Yunoue et al. |
| 2014/0000975 | A1 | 1/2014 | Ueda |
| 2014/0005898 | A1 | 1/2014 | Byers et al. |
| 2014/0196558 | A1 | 7/2014 | Meislahn et al. |
| 2014/0234062 | A1 | 8/2014 | Adachi et al. |
| 2014/0265254 | A1 | 9/2014 | Sekine et al. |
| 2014/0271078 | A1 | 9/2014 | Koch |
| 2015/0053489 | A1 | 2/2015 | Nakazawa et al. |
| 2015/0090517 | A1 | 4/2015 | Okuda et al. |
| 2015/0375977 | A1 | 12/2015 | Nakazawa et al. |
| 2016/0134001 | A1 | 5/2016 | Lindholm et al. |
| 2018/0319392 | A1 | 11/2018 | Posselius et al. |
| 2018/0334201 | A1 | 11/2018 | Meager |
| 2019/0389705 | A1 | 12/2019 | Radtke et al. |
| 2020/0263390 | A1 | 8/2020 | Raj et al. |
| 2021/0002111 | A1 * | 1/2021 | Rushton .............. B66F 9/07554 |
| 2021/0016648 | A1 | 1/2021 | Iotti |
| 2021/0032847 | A1 | 2/2021 | Carlson et al. |

FOREIGN PATENT DOCUMENTS

| | | |
|---|---|---|
| CN | 201049874 Y | 4/2008 |
| CN | 201501336 U | 6/2010 |
| CN | 102730601 A | 10/2012 |
| CN | 203112423 U | 8/2013 |
| CN | 103443016 A | 12/2013 |
| CN | 104960567 A | 10/2015 |
| CN | 207632459 U | 7/2018 |
| DE | 102005042940 A1 | 3/2007 |
| DE | 202014000738 U1 | 3/2014 |
| DE | 102013113809 A1 | 6/2015 |
| DE | 202016101145 U1 | 5/2016 |
| EP | 2678262 A1 | 1/2014 |
| EP | 2700611 A1 | 2/2014 |
| EP | 2942218 A1 | 11/2015 |
| EP | 2965939 A1 | 1/2016 |
| EP | 3587163 A1 | 1/2020 |
| FR | 3018797 A1 | 9/2015 |
| GB | 1361832 A | 7/1974 |
| GB | 2529286 A | 2/2016 |
| JP | 2000-143188 A | 5/2000 |
| JP | 2002-326799 A | 11/2002 |
| JP | 2004168149 A | 6/2004 |
| JP | 2005067522 A | 3/2005 |
| JP | 2012201187 A | 10/2012 |
| JP | 2012201188 A | 10/2012 |
| KR | 20010026778 A * | 4/2001 |
| KR | 20110071980 A | 6/2011 |
| KR | 20120121577 A | 11/2012 |
| KR | 20170046366 A | 5/2017 |
| WO | WO-2010/058768 A1 | 5/2010 |
| WO | WO-2012/084508 A2 | 6/2012 |
| WO | WO-2019/040028 A2 | 2/2019 |

OTHER PUBLICATIONS

Lee, KR20010026778, machine translation. Apr. 6, 2001 (Year: 2001).*
Non-Final Office Action issued in U.S. Appl. No. 16/806,985, dated Aug. 24, 2020.
Final Office Action issued in U.S. Appl. No. 16/806,985, dated Jan. 15, 2021.
Additional art cited by Examiner in U.S. Appl. No. 16/806,985, dated May 18, 2021.
Extended European Search Report for EP 20 16 0238, dated Jul. 22, 2020.
Extended European Search Report for EP 20 16 0255, dated Jul. 23, 2020.
Extended European Search Report for EP 20 16 0256, dated Jul. 28, 2020.
Search Report for GB 1904474.2, dated Sep. 25, 2019.
Combined Search and Examination Report issued in GB 2218270.3, dated Jan. 17, 2023.
Combined Search and Examination Report issued in GB2300766.9, dated Feb. 1, 2023.
Combined Search and Examination Report for GB2308074.0, dated Jun. 14, 2023.
Combined Search and Examination Report issued in GB2306237.5, dated May 24, 2023.
Examination Report issued in GB2306237.5, dated Jul. 12, 2023.
"Volvo CE fully electric excavator: the EX02", Volvo Construction Equipment, [online], youtube.com <http://youtube.com>, available from https://www.youtube.com/watch?v=kV1T5tEgZPA.
"EMining AG-eDumper", eMining AG, [online], youtube.com, available from https://www.youtube.com/watch?v=sbPH5.
"Caterpillar unveils an all-electric 26-ton excavator with a giant 300 kWh battery pack", electrek, [online], electrek.co, available from https://electrek.co/2019/01/29/caterpillar-electric-excavator-giant-battery-pack/.
"JCB sparks huge interest with its first ever electric digger", JCB, [online], jcb.com, available from https://www.jcb.com/en-gb/news/2018/04/jcb-sparks-huge-interest-with-its-first-ever-electric-digger.
Search Report for GB1902826.5, dated Aug. 23, 2019.
Search Report for GB1902827.3, dated Aug. 1, 2019.
Search Report for GB 1904474.2, dated Sep. 24, 2019.
Office Action issued in European Patent Application No. 20160255.4, dated Aug. 26, 2022.
Office Action issued in GB Patent Application No. 1904474.2, dated Aug. 4, 2022.
Office Action issued in GB Patent Application No. 1902827.3, dated Jun. 30, 2022.
Office Action issued in GB Patent Application No. 1902827.3, dated Oct. 20, 2022.
Non-Final Office Action issued in U.S. Appl. No. 16/806,912, dated Nov. 7, 2022.

* cited by examiner

WORKING MACHINE

FIELD

The present disclosure relates to a control system for a working machine including a load handling apparatus, a machine including such a control system, a control method, an electric energy storage module for use with a working machine and a method of providing power to a working machine.

BACKGROUND

Machines including a load handling apparatus typically include a front and a rear axle supporting a machine body on which the load handling apparatus is mounted. Wheels are normally coupled to the front and rear axles, the wheels being configured to engage the ground and permit movement of the machine across the ground.

The load handling apparatus includes, for example, an extendable lifting arm moveable by one or more actuators with respect to the machine body. The lifting arm includes a load carrying implement to carry a load such that a load carried by the load carrying implement can be moved with respect to the machine body by the lifting arm.

Working machines are typically diesel powered. However, there is a drive in the industry to move towards hybrid or electric vehicles, particularly where such vehicles are used indoors. One difficulty with this is removal of the diesel engine, since this significantly alters the weight distribution of the machine and has implications for the stability of the working machine.

Movement of the load produces a moment of tilt about an axis of rotation of the machine. For example, a moment of tilt may be induced about an axis of one of the front or rear axles. Alternatively, for example when the machine positioned on a lateral incline, the moment of tilt may be induced about a longitudinal axis of the machine.

Extension of the lifting arm in forwards direction, particularly when carrying a load, induces a moment of tilt about the axis of rotation of the front axle. As a result, the portion of the machine (and load) weight supported by the rear axle decreases. Further, extension of the lifting arm in a forwards and/or direction when the machine is positioned on a lateral incline can alter the centre of gravity of the machine, increasing the load on the lowermost wheels.

The present disclosure seeks to overcome or at least mitigate the problems of the prior art.

SUMMARY

In accordance with an aspect of the disclosure, a control system for use with a working machine is provided, the working machine comprising a machine body, and a load handling apparatus coupled to the machine body and moveable by a movement actuator with respect to the machine body, the working machine being configured for use with at least one electric energy storage module, wherein the control system comprises a controller configured to: receive or acquire information representative of an attribute of said electric energy storage module; determine permitted and/or prohibited operations of the working machine based on the received or acquired information; and issue an operations signal for use by at least one element of the working machine corresponding to the determined permitted and/or prohibited operations.

In this way, the permitted and/or prohibited operations of the working machine can be calculated based on an attribute of the electric energy storage module being used with the machine. The working machine may then be operated in accordance with the permitted and/or prohibited operations. Accordingly, the working machine can be operated in a manner which is suitable and/or safe, given the particular attribute(s) of the electric energy storage module.

For example, the attribute of the electric energy storage module may be representative of the weight of the electric energy storage module, the position of the electric energy storage module on the working machine, and/or a power capacity of the electric energy storage module.

The working machine may be used with more than one electric storage energy module and so information representative of attributes of each of said electric energy storage modules may be received or acquired by the controller. Additionally or alternatively, information representative of a combined attribute of all the electric energy storage modules present may be received or acquired by the controller. For example, a total weight of the electric energy storage modules, a position of all the electric energy storage modules, and/or a total power capacity of the electric storage energy modules.

Depending on the attributes of the electric energy storage unit mounted on the working machine, limitations on the operations of the working machine can be determined. For example, the controller may receive or acquire information representative of the weight of the electric energy storage unit. The risk of the machine tipping over due to lateral and/or longitudinal tilt, will vary depending on the weight of the electric energy storage unit. Therefore, the controller is configured to determine permitted and/or prohibited operations of the machine in order to keep the tipping risk to a minimum and prevent or alert against unsafe operations being performed.

In some embodiments, the controller is configured to receive or acquire information representative of the power capacity of said electric energy storage unit and calculate the permitted and/or prohibited operations based on the power capacity of the machine.

Optionally, the at least one element comprises an element configured to control operations carried out by the working machine in accordance with the determined permitted and/or prohibited operations.

For example, one of the at least one elements may be configured to control operation of the load handling apparatus of the working machine.

Optionally, the at least one element comprises an element configured to display information corresponding to the determined permitted and/or prohibited operations to an operator.

The weight and/or position of the electric energy storage unit are important in determining the weight distribution across the working machine and therefore the likelihood of the machine tilting laterally or longitudinally in a given operation.

In some embodiments, the limits of operation of the working machine are visually displayed to a user. In some embodiments, the limitations on the operations permitted are used to control operation of the machine automatically.

Optionally, the controller is configured to acquire information indicative of the attribute of the at least one electric energy storage module directly from the at least one electric energy storage module.

Optionally, the control system includes a sensor configured to determine information representative of an attribute of the electric energy storage module and to transmit this information to the controller, optionally wherein the sensor is a load sensor and the information is representative of the weight and/or position of the at least one electric energy storage module.

The load sensor may be configured to issue an attribute signal representative of an attribute of said electric energy storage module to the controller.

Optionally, the controller is configured to receive or acquire information representative of the weight and/or position of the at least one electric energy storage module.

Optionally, the controller includes a machine stabilisation decision logic, configured to maintain stability of the working machine, wherein the information representative of the weight and/or position of the at least one electric energy storage module is an input to the stabilisation decision logic, and wherein the determined permitted and/or prohibited operations of the working machine are determined based on the stabilisation decision logic.

This enables the controller to determine the risk of the machine tipping over.

Optionally, the controller is configured to receive a tilt signal representative of a moment of tilt of the machine, and the controller is configured to issue an operations signal for use by an element of the machine, including the movement actuator, which in response to the operations signal issued by the controller, is configured to restrict or substantially prevent a movement of the load handling apparatus when a value of the tilt signal reaches a threshold value, the threshold value being dependent on the information representative of the weight and/or position of the at least one electric energy storage module.

In this way, the weight and/or position of the at least one electric energy storage module is taken into account when determining the threshold value which corresponds to a moment of tilt which is unsafe for the working machine. For example, where the electric energy storage module(s) has a higher weight, the threshold value can be correspondingly higher. Conversely where the electric energy storage module(s) has a relatively low weight, the threshold value of the moment of tilt may be correspondingly lower. In this way, safety of the machine use is maintained.

Optionally, the controller is configured to receive an orientation signal representative of the orientation of the load handling apparatus with respect to a reference orientation, and the threshold value is dependent on the orientation signal.

Advantageously the control system ensures the stability of the machine irrespective of the longitudinal inclination of the machine it controls, but does not unnecessarily restrict the productivity of the machine.

Optionally, the orientation signal representative of the orientation of the load handling apparatus is a signal representative of an angle of the load handling apparatus with respect to the reference orientation.

By reference orientation we mean an orientation that is fixed in space irrespective of the orientation of the machine itself. As such the orientation of the load handling apparatus can be considered to be an absolute orientation.

Optionally, the threshold has a first value corresponding to a first orientation of the load handling apparatus with respect to the reference orientation and the threshold has a second value corresponding to a second orientation of the load handling apparatus with respect to the reference orientation, the first value being less than the second value and the first orientation being lower than the second orientation.

For typical machine geometries a higher threshold value is usually required at higher orientations (e.g. larger angles with respect to a horizontal level).

Optionally, the threshold value includes a first threshold value associated with one or more predetermined orientations of the load handling apparatus and a second threshold value associated with one or more other predetermined orientations of the load handling apparatus.

Optionally the threshold value is proportional or substantially proportional to the signal representative of an orientation of the load handling apparatus over a range of orientations of the load handling apparatus.

Optionally, the range of orientations of the load handling apparatus is between a first and a second orientation of the load handling apparatus, and at least one different threshold value is used when the position of the load handling apparatus is outside of the range.

Optionally the control system further comprises an absolute orientation sensor, for example and accelerometer or gyroscope, configured to send a signal representative of the orientation of the load handling apparatus with respect to a reference orientation.

Optionally, the signal representative of the moment of tilt of the machine is a signal representative of the load on an axle of the machine, e.g. a rear axle.

Optionally, the controller is further configured to receive a stabiliser signal representative of whether one or more stabilisers of the machine are deployed, and the threshold value is dependent on the stabiliser signal.

If a machine has stabilisers, the deployment thereof may require alteration of the threshold value, and therefore it is desirable for this to be signalled to the controller.

Optionally, the controller is further configured to receive a signal representative of a position of the load handling apparatus relative to the machine body.

Optionally, the controller is configured to issue a signal to set an interlock based on the position of the load handling apparatus relative to the machine body.

Setting interlocks with respect to a position relative to the machine body may be preferable in certain circumstances as they may be clearer to the machine operator during operation.

Optionally the element of the machine includes an indicator of the machine which, in response to the operations signal issued by the controller, is configured to display and/or sound a warning.

This informs the operator when they operate the machine in a potentially unsafe manner.

Optionally, the working machine is configured to be fitted with one or more ballast modules and wherein the controller is configured to receive or acquire information representative of an attribute of said ballast module (e.g. weight and/or position), when present.

For example, where only a single electric energy storage module is required to provide the necessary power capacity, additional ballast weight can be added to the machine by mounting a ballast module in place of an additional electric energy storage module. In this way, it is not necessary to mount more electric energy storage modules than is required to meet the machine's power demands in order to increase the weight. A separate ballast module can instead be mounted in the machine, thereby improving cost efficiency.

Optionally the controller is configured to receive or acquire information representative of the power capacity of the at least one electric energy storage module, and the controller is configured to determine permitted and/or prohibited operations of the machine based on the information representative of the power capacity of the at least one electric energy storage module.

For example, where the anticipated use of the machine is for low load operations, an electric energy storage module having a relatively low power capacity and/or fewer electric energy storage modules may be mounted in the machine. Alternatively, where the machine is to be used for relatively high load operations, an electric energy storage module having a higher power capacity and/or more electric energy storage modules may be mounted in the machine. This means that the electric energy storage unit can be tailored to the expected demands of the machine. This improves cost, since electric energy storage modules are expensive, and power efficiency, since the machine is not carrying unnecessary mass of electric energy storage modules which are not needed.

In accordance with an aspect of the disclosure, a working machine is provided comprising a machine body, a ground engaging propulsion structure to permit movement of the machine over the ground, and a load handling apparatus coupled to the machine body and moveable by a movement actuator with respect to the machine body, the machine being configured for use with at least one electric energy storage module, wherein, in use, the at least one electric energy storage module is connected to the working machine to provide power to the working machine.

Optionally, the working machine is configured to be connected to a range of electric energy storage modules, having different attributes, e.g. power capacity and/or weight attributes.

In this way, a suitable combination of electric energy storage modules can be selected for a particular use or operation of the working machine.

Optionally, the working machine comprises a mount for at least a first electric energy storage module and a second electric energy storage module, the machine being operable with at least one of the first and second electric storage modules present.

In this way, the working machine can be operated with only a single electric energy storage module or more than one electric energy storage modules, as required, e.g. depending on the required power capacity.

Optionally the first and/or second electric energy storage modules are configured to be removable from the mount and replaceable, such that the first and/or second electric energy storage modules are interchangeable.

In this way, when one of the electric energy storage modules runs out of power or charge, it can be removed from the working machine and replaced with a fully charged replacement electric energy storage module. Accordingly, the electric energy storage modules can simply be interchanged and the working machine can continue operating with a new electric energy storage module. The working machine itself does not need to cease operation in order to be re-charged, the electric energy storage modules can simply be replaced with fully charged modules.

Optionally the first and/or second electric energy storage modules comprise a connector to connect the respective electric energy storage module to the working machine.

Accordingly, a simple and quick means for disconnecting and reconnecting electric energy storage modules to the working machine is provided. For example, the connector may be a quick release connector.

Optionally the mount is configured to receive a ballast module, optionally wherein the ballast module comprises a connector to connect the ballast module to the working machine.

For example, where only a single electric energy storage module is required to provide the necessary power capacity, additional ballast weight can be added to the machine by mounting a ballast module in place of an additional electric energy storage module. In this way, it is not necessary to mount more electric energy storage modules than is required to meet the machine's power demands in order to increase the weight. A separate ballast module can instead be mounted in the machine, thereby improving cost efficiency. In exemplary embodiments, the connector may be a quick release connector.

Optionally, the at least one electric energy storage module is selected based on an intended use of the working machine.

For example, where the anticipated use of the machine is for low load operations, an electric energy storage module having a relatively low power capacity and/or fewer electric energy storage modules may be mounted in the machine. Alternatively, where the machine is to be used for relatively high load operations, an electric energy storage module having a higher power capacity and/or more electric energy storage modules may be mounted in the machine. This means that the electric energy storage unit can be tailored to the expected demands of the machine. This improves cost and power efficiency.

In accordance with an aspect of the disclosure, a working machine is provided as disclosed herein, comprising a control system as disclosed herein.

Optionally, the load handling apparatus comprises a lifting arm, the lifting arm being at least pivotable with respect to the machine body, optionally pivotable about a substantially transverse axis of the machine and the lifting arm extends substantially parallel to a longitudinal axis of the machine, optionally wherein the lifting arm is pivotable about a location between a longitudinal mid-point of the machine body and a rear of the machine body.

Optionally, a load handling implement is mountable to the lifting arm forward of the machine body.

Optionally, the machine further comprises an operator cab which has a fixed angular orientation with respect to front and/or rear axles of the working machine.

In accordance with an aspect of the disclosure, an electric energy storage module for use with a working machine is provided, the electric energy storage module comprising a connection structure for fitting to said working machine such that, in use, the electric energy storage module is configured to provide power to the working machine.

Optionally, the module is configured to be removable from the working machine and replaceable.

Optionally, the module comprises a quick release connector to connect the respective electric energy storage module to the working machine.

In accordance with an aspect of the disclosure, a method of providing power to a working machine is provided comprising a machine body, a ground engaging propulsion structure to permit movement of the machine over the ground, and a load handling apparatus coupled to the machine body and moveable by a movement actuator with respect to the machine body, the machine being configured for use with at least one electric energy storage module, wherein, in use, the at least one electric energy storage module is connected to the working machine to provide power to the working machine, the method including: determining a power requirement for the working machine, selecting at least one electric energy storage module to satisfy the determined power requirement, and connecting the at least one electric energy storage module to the working machine such that, in use, the at least one electric energy storage module is configured to provide power to the working machine.

In this way, the electric energy storage modules which are connected to the machine are selected based on an intended use of the machine. Consequently, where the intended use of the machine involves only low power requirements, a corresponding low capacity electric energy module(s) can be provided. Conversely, where the intended use of the machine involves high power requirements, a corresponding high capacity electric energy storage module(s) can be provided. This improves the cost effectiveness of the working machine.

In accordance with an aspect of the disclosure, a method of controlling a working machine is provided, the working machine comprising a machine body, and a load handling apparatus coupled to the machine body and moveable by a movement actuator with respect to the machine body, the working machine being configured for use with at least one electric energy storage module, wherein method comprises: receiving or acquiring information representative of an attribute of said electric energy storage module; determining permitted and/or prohibited operations of the working machine based on the received or acquired information; and issuing an operations signal for use by at least one element of the working machine corresponding to the determined permitted and/or prohibited operations.

In accordance with an aspect of the disclosure, a working machine is provided comprising: a machine body having an operator cab, a ground engaging propulsion structure to permit movement of the machine over the ground, a load handling apparatus coupled to the machine body and moveable by a movement actuator with respect to the machine body, and an electric energy storage unit for providing power to the working machine. The working machine comprises a longitudinal axis, wherein the operator cab is positioned towards a first side of the working machine with respect to the longitudinal axis, and the electric energy storage unit is positioned towards a second side of the working machine with respect to the longitudinal axis, wherein the first and second sides are located opposite each other.

In this way, the operator cab and the electric energy storage unit are provided on opposite sides of the working machine, such that the electric energy storage unit acts as a counterweight to the operator cab. In a diesel powered working machine, typically the diesel engine is provided and positioned as a counterweight to the operator cab. However, where the diesel engine is not present, e.g. in an electric vehicle, such counterweight may not be provided. Therefore, by providing the electric energy storage unit and locating this such that it counterbalances the operator cab, an electric vehicle can be provided with improved stability, even though the diesel engine has been removed.

Optionally, the electric energy storage unit is positioned at a location on the working machine to provide a counterweight to operator cab, relative to the longitudinal axis.

In this way, the electric energy storage unit is used as ballast and positioned to counterbalance the operator cab. Accordingly, improved load distribution laterally across the machine can be achieved.

Optionally, the electric energy storage unit and the operator cab are positioned to axially overlap with respect to the longitudinal axis.

In this way, the effectiveness of the electric energy storage unit as a counterweight is improved.

Optionally, the electric energy storage unit and the operator cab are positioned in axial alignment with respect to the longitudinal axis.

Optionally, the ground engaging propulsion structure comprises a front axle and a rear axle supporting the machine body.

Optionally, the electric energy storage unit is positioned between the front and rear axles, e.g. the electric energy storage unit does not extend beyond the front and/or rear axles in a direction parallel to the longitudinal axis.

In this way, easy access to the electric energy storage unit is provided and is not inhibited by the front and/or rear axles on the associated wheels.

Optionally, the operator cab is positioned between the front and rear axles, e.g. the operator cab does not extend beyond the front and/or rear axles in a direction parallel to the longitudinal axis.

This enables easy access to the operator cab for a user getting into and out of the cab.

Optionally, the operator cab has a fixed angular orientation with respect to the front and/or rear axles.

Optionally, the machine body comprises a base and the electric energy storage unit is located at or above the base, when the working machine is situated on flat ground.

In other words, the electric energy storage unit is not positioned underneath the base, where it would be vulnerable to damage, particularly over uneven ground. In contrast, the electric energy storage unit is located at or above the base where such damage is less likely to occur.

Optionally, the working machine comprises an electric drive motor configured to drive a driveshaft of the working machine, wherein the drive motor is located such that a longitudinal axis of a transmission of the motor is provided parallel to the driveshaft.

In this way, a simpler coupling between the motor and the drive shaft is permitted.

Optionally, the drive motor is positioned between the electric energy storage unit and the operator cab.

Optionally, the load handling apparatus comprises a lifting arm. The lifting arm may be at least pivotable with respect to the machine body. Optionally the lifting arm is pivotable about a substantially transverse axis of the machine and the lifting arm extends substantially parallel to the longitudinal axis of the machine. Optionally the lifting arm is pivotable about a location between a longitudinal mid-point of the machine body and a rear of the machine body.

Optionally, a load handling implement is mountable to the lifting arm forward of the machine body.

Optionally, the working machine comprises a hydraulic motor configured to actuate the load handling apparatus.

By providing separate motors to control the movement of the load handling apparatus and the drive shaft, smaller motors can be provided and optimally positioned on the working machine to provide an even weight distribution across the machine.

In some embodiments, the drive motor is positioned towards a first side of the machine and the hydraulic motor is positioned towards a second side of the machine.

In some embodiments, the drive motor is positioned towards side on which the electric energy storage unit is located.

In some embodiments, the longitudinal axis of the transmission of the drive motor is provided on the same horizontal plane as the axis of the drive shaft, when the machine is on a horizontal surface. In other words, the drive motor is alongside the driveshaft, rather than being positioned above or below. In this way, a more compact arrangement is provided.

In some embodiments, the longitudinal axis of the transmission of the drive motor is provided above or below the horizontal plane of the drive shaft, when the machine is on a horizontal surface. In other words, the drive motor is positioned above or below the driveshaft.

In some embodiments, the motor is offset from the vertical plane of the driveshaft, when the machine is on a horizontal surface, rather than being positioned directly above or below the driveshaft.

In this way, the position of the motor may be optimised in relation to the available space in the machine body.

For example, the longitudinal axis of the transmission of the drive motor is provided at an angle of greater than or less than 0° to the drive shaft, with reference to the horizontal plane of the drive shaft, e.g. between 20 and 70°, between 110 and 160°, between 30 and 60°, between 120 and 150°, for example approximately 45°, for example approximately 135°.

In some embodiments the drive motor is positioned towards the front axle of the machine. In other words, the drive motor is positioned off-centre with respect to the centre of the drive shaft, in a direction towards the front axle.

In some embodiments, the hydraulic motor is positioned towards the side of the machine on which the operator cab is located.

In some embodiments, the hydraulic motor is provided above the drive shaft, with respect to the normal orientation of the machine. This may improve the balance of the machine.

In some embodiments the hydraulic motor is positioned towards the rear axle of the machine. In other words, the hydraulic motor is positioned off-centre with respect to the centre of the drive shaft, in a direction towards the rear axle.

Optionally, the electric energy storage unit comprises at least one electric energy storage module.

In other words, the electric energy storage unit is made up of one or more electric energy storage modules, each of which being arranged to provide power to the working machine.

In some embodiments, the electric energy storage modules may be interchangeable on the working machine.

Optionally, the working machine comprises a mount for at least a first electric energy storage module and a second electric energy storage module, the machine being operable with at least one of the first and second storage modules present.

In this way, the working machine can be operated with only a single electric energy storage module or more than one electric energy storage modules, as required, e.g. depending on the required power capacity.

Optionally, the first and/or second electric energy storage modules are configured to be removable from the mount and replaceable, such that the first and/or second electric energy storage modules are interchangeable.

In this way, when one of the electric energy storage modules runs out of power or charge, it can be removed from the working machine and replaced with a fully charged replacement electric energy storage module. Accordingly, the electric energy storage modules can simply be interchanged and the working machine can continue operating with a new electric energy storage module. The working machine itself does not need to cease operation in order to be re-charged, the electric energy storage modules can simply be replaced with fully charged modules.

Optionally, the first and/or second electric energy storage modules comprise a connector to connect the respective electric energy storage module to the working machine, e.g. a quick release connector.

Accordingly, a simple and quick means for disconnecting and reconnecting electric energy storage modules to the working machine is provided.

Optionally, the mount is configured to receive a ballast module in place of the first or second electric storage module, optionally wherein the ballast module comprises a connector, e.g. a quick release connector, to connect the ballast module to the working machine.

For example, where only a single electric energy storage module is required to provide the necessary power capacity, additional ballast weight can be added to the machine by mounting a ballast module in place of an additional electric energy storage module. In this way, it is not necessary to mount more electric energy storage modules than is required to meet the machine's power demands in order to increase the weight. A separate ballast module can instead be mounted in the machine, thereby improving cost efficiency.

Optionally, the electric energy storage unit (e.g. a first and/or second electric energy storage module) is selected based on an intended use of the working machine.

For example, where the anticipated use of the machine is for low load operations, an electric energy storage module having a relatively low power capacity and/or fewer electric energy storage modules may be mounted in the machine. Alternatively, where the machine is to be used for relatively high load operations, an electric energy storage module having a higher power capacity and/or more electric energy storage modules may be mounted in the machine. This means that the electric energy storage unit can be tailored to the expected demands of the machine. This improves cost, since electric energy storage modules are expensive, and power efficiency, since the machine is not carrying unnecessary mass of electric energy storage modules which are not needed.

Optionally, the machine body comprises an enclosure in which the electric energy storage unit is housed, and optionally wherein the enclosure comprises a lid for access to the electric energy storage unit.

This protects the electric energy storage unit against damage and debris.

Optionally, the working machine comprises a controller configured to: receive or acquire information representative of an attribute of said electric energy storage unit; determine permitted and/or prohibited operations of the working machine based on the received or acquired information; and issue an operations signal for use by at least one element of the working machine corresponding to the determined permitted and/or prohibited operations.

In this way, the permitted and/or prohibited operations of the working machine can be calculated based on an attribute of the electric energy storage module being used with the machine. The working machine may then be operated in accordance with the permitted and/or prohibited operations. Accordingly, the working machine can be operated in a manner which is suitable and/or safe, given the particular attribute(s) of the electric energy storage module.

For example, the attribute of the electric energy storage module may be representative of the weight of the electric energy storage module, the position of the electric energy storage module on the working machine, and/or a power capacity of the electric energy storage module.

The working machine may be used with more than one electric storage energy module and so information representative of attributes of each of said electric energy storage modules may be received or acquired by the control system. Additionally or alternatively, information representative of a combined attribute of all the electric energy storage modules present may be received or acquired by the controller. For example, a total weight of the electric energy storage modules, a position of all the electric energy storage modules, and/or a total power capacity of the electric storage energy modules.

Depending on the attributes of the electric energy storage unit mounted on the working machine, limitations on the operations of the working machine can be determined. For example, the controller may receive or acquire information representative of the weight of the electric energy storage unit. The risk of the machine tipping over due to lateral and/or longitudinal tilt, will vary depending on the weight of the electric energy storage unit. Therefore, the controller is configured to determine permitted and/or prohibited operations of the machine in order to keep the tipping risk to a minimum and prevent or alert against unsafe operations being performed.

In some embodiments, the controller is configured to receive or acquire information representative of the power capacity of said electric energy storage unit and calculate the permitted and/or prohibited operations based on the power capacity of the machine.

Optionally the controller is configured to receive or acquire information representative of the weight and/or position of the electric energy storage unit.

The weight and/or position of the electric energy storage unit are important in determining the weight distribution across the working machine and therefore the likelihood of the machine tilting laterally or longitudinally in a given operation.

In some embodiments, the limits of operation of the working machine are visually displayed to a user. In some embodiments, the limitations on the operations permitted are used to control operation of the machine automatically.

Optionally, the working machine includes a sensor configured to determine information representative of an attribute of the electric energy storage module and transmit this information to the controller, optionally wherein the sensor is a load sensor and the information is representative of the weight and/or position of the at least one electric energy storage module.

Optionally, the controller is configured to acquire information indicative of the attribute of the at least one electric energy storage module directly from the at least one electric energy storage module.

Optionally, the controller includes a machine stabilisation decision logic, configured to maintain stability of the working machine, wherein information representative of the weight and/or position attribute(s) of the at least one electric energy storage module is an input to the stabilisation decision logic, and wherein the determined permitted and/or prohibited operations of the working machine are determined based on the stabilisation decision logic.

This enables the controller to determine the risk of the machine tipping over.

Optionally, the stabilisation decision logic is configured such that the permitted load of the load handling apparatus and/or the permitted lift height of the load handling apparatus is dependent on the attribute of said electric energy storage unit (e.g. weight).

For example, the permitted load of the load handling apparatus and/or the permitted lift height of the load handling apparatus may be based on the likelihood of the machine tipping over in a lateral and/or longitudinal direction.

Optionally, the permitted load of the load handling apparatus and/or the permitted lift height of the load handling apparatus is lower for a lower weight of electric energy storage unit present, and is higher for a higher weight of electric energy storage unit present.

BRIEF DESCRIPTION OF THE DRAWINGS

Embodiments disclosed herein will now be described, by way of example only, with reference to the accompanying drawings, in which.

DETAILED DESCRIPTION

Figure 1:
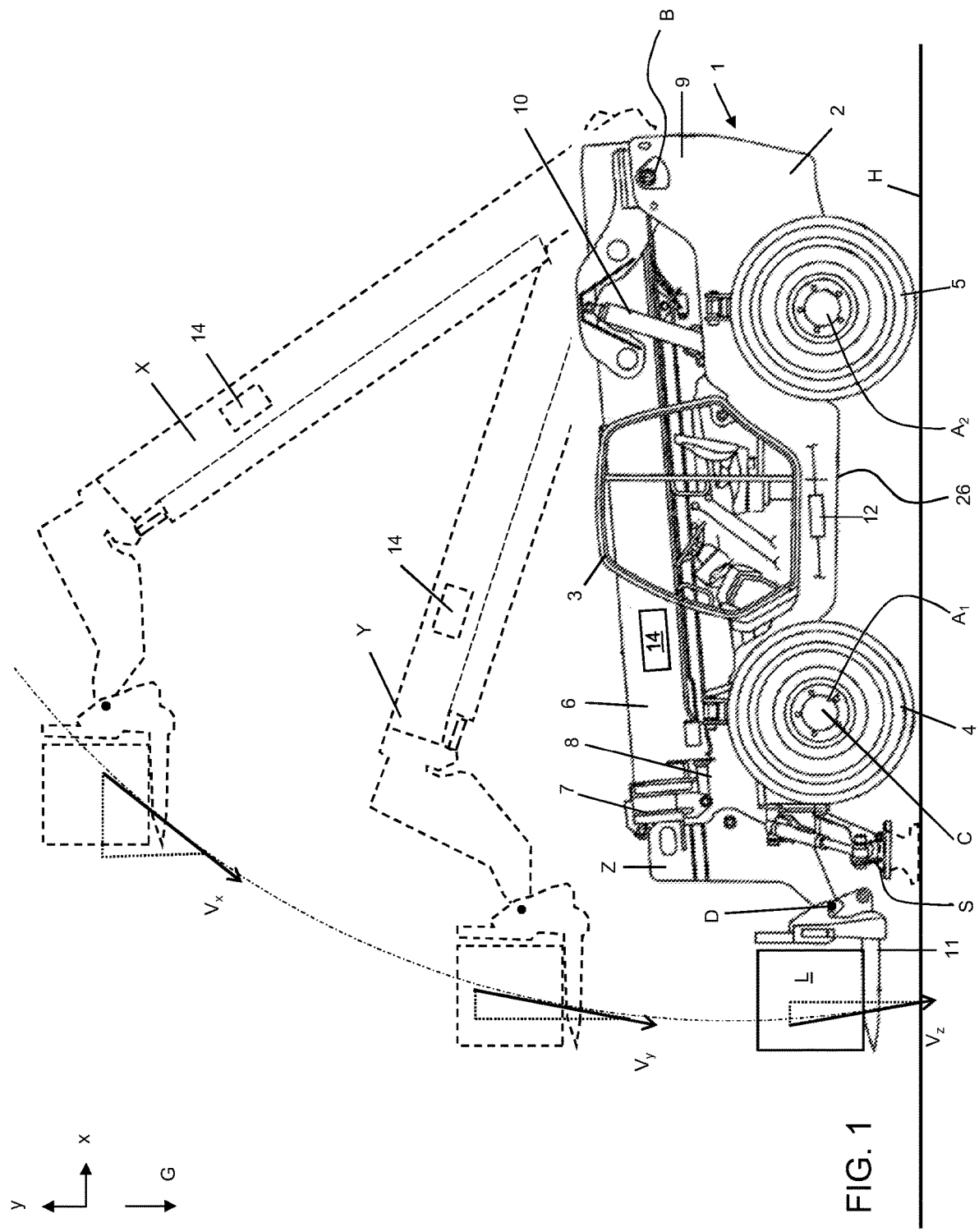
FIG. 1 is a side view of a working machine on horizontal ground.

With reference to FIG. 1, an embodiment of the teachings includes a machine 1 which may be a load handling machine. In this embodiment the load handling machine is a telescopic handler. In other embodiments the load handling machine may be a skid-steer loader, a compact track loader, a wheel loader, or a telescopic wheel loader, for example. Such machines may be denoted as off-highway working machines. The machine 1 includes a machine body 2 which may include, for example, an operator's cab 3 from which an operator can operate the machine 1.

In an embodiment, the machine 1 has a ground engaging propulsion structure comprising a first axle $A_1$ and a second axle $A_2$, each axle being coupled to a pair of wheels (two wheels 4, 5 are shown in FIG. 1 with one wheel 4 connected to the first axle $A_1$ and one wheel 5 connected to the second axle $A_2$). The first axle $A_1$ may be a front axle and the second axle $A_2$ may be a rear axle. One or both of the axles $A_1$, $A_2$ may be coupled to a motor M (see FIGS. 3 and 4 discussed below) which is configured to drive movement of one or both pairs of wheels 4, 5. Thus, the wheels may contact a ground surface H and rotation of the wheels 4, 5 may cause movement of the machine with respect to the ground surface. In other embodiments the ground engaging propulsion structure comprises tracks.

In an embodiment, at least one of the first and second axles $A_1$, $A_2$ is coupled to the machine body 2 by a pivot joint (not shown) located at substantially the centre of the axle such that the axle can rock about a longitudinal axis of the machine 1—thus, improving stability of the machine 1 when moving across uneven ground. It will be appreciated that this effect can be achieved in other known manners.

A load handling apparatus 6, 7 is coupled to the machine body 2. The load handling apparatus 6, 7 may be mounted by a mount 9 to the machine body 2. In an embodiment, the load handling apparatus 6, 7 includes a lifting arm 6, 7.

The lifting arm 6, 7 may be a telescopic arm having a first section 6 connected to the mount 9 and a second section 7 which is telescopically fitted to the first section 6. In this embodiment, the second section 7 of the lifting arm 6, 7 is telescopically moveable with respect to the first section 6 such that the lifting arm 6, 7 can be extended and retracted. Movement of the first section 6 with respect to the second section 7 of the lifting arm 6, 7 may be achieved by use of an extension actuator 8 which may be a double acting hydraulic linear actuator. In some embodiments, movement of the first section 6 with respect to the second section 7 may be achieved by use of an electric linear actuator, a telescopic extension ram, multiple extension rams, and/or a chain and pulley system. One end of the extension actuator 8 is coupled to the first section 6 of the lifting arm 6, 7 and another end of the extension actuator 8 is coupled to the second section 7 of the lifting arm 6, 7 such that extension of the extension actuator 8 causes extension of the lifting arm 6, 7 and retraction of the extension actuator 8 causes retraction of the lifting arm 6, 7. As will be appreciated, the lifting arm 6, 7 may include a plurality of sections: for example, the lifting arm 6, 7 may comprise two, three, four or more sections. Each arm section may be telescopically fitted to at least one other section.

The lifting arm 6, 7 can be moved with respect to the machine body 2 and the movement is preferably, at least in part, rotational movement about the mount 9 (about pivot B of the lifting arm 6, 7). The rotational movement is about a substantially transverse axis of the machine 1, the pivot B being transversely arranged.

Rotational movement of the lifting arm 6, 7 with respect to the machine body 2 is, in an embodiment, achieved by use of at least one lifting actuator 10 coupled, at one end, to the first section 6 of the lifting arm 6, 7 and, at a second end, to the machine body 2. The lifting actuator 10 is a double acting hydraulic linear actuator, but may alternatively be single acting. In some embodiments, the lifting actuator is an electric linear actuator.

FIG. 1 shows the lifting arm 6, 7 positioned at three positions, namely X, Y and Z, with positions X and Y shown in dashed lines in simplified form. When positioned at position X the angle between the lifting arm and a ground level is 55 degrees. This angle is measured with respect to the longitudinal major portion of the lifting arm 6, 7, i.e. the part that extends and retracts if the arm is telescopic. In other embodiments, a different measure of the angle may be used, for example an angle defined using a notional line between the pivot B and the pivot D for the load handling implement (see below). When positioned at position Y the angle is 27 degrees. When positioned at position Z the angle is −5 degrees. 55 degrees and −5 degrees represent the upper and lower limits of angular movement for the machine 1 with stabilisers retracted. The upper limit may be permitted to be increased to, say, 70 degrees when the stabilisers are deployed to contact the ground (see below). Clearly, the lifting arm can be positioned at any angle between these limits. Other machines may have different upper and lower angular limits dependent upon the operational requirements of the machine (maximum and minimum lift height and forward reach etc.) and the geometry of the machine and load handling apparatus (e.g. position of pivot B, dimensions of cranked portion at the distal end of the second section 7 of the lifting arm 6, 7). As will be appreciated, when the lifting arm is positioned relatively close to the ground it is at a relatively small angle and when it is positioned relatively remotely from the ground it is at a relatively large or high angle.

A load handling implement 11 may be located at a distal end of the lifting arm 6, 7. The load handling implement 11 may include a fork-type implement which may be rotatable with respect to the lifting arm 6, 7 about a pivot D, this pivot also being transversely arranged. Other implements may be fitted such as shovels, grabs etc. Movement of the load handling implement 11 may be achieved by use of a double acting linear hydraulic actuator (not shown) coupled to the load handling implement 11 and the distal end of the section 7 of the lifting arm 6, 7.

Off-highway machines 1 of the teachings are configured to transport loads L over uneven ground, i.e. with a load held by the load handling implement 11, an operator controls the propulsion structure to move the entire machine with the load from one location to another.

This may be contrasted with machines such as mobile cranes and roto-telehandlers in which a boom is pivotable about both a lateral and an upright axis—i.e. the boom can slew relative to a machine body on a turret or turntable—as well as pivot upwards about the lateral axis. Such machines may be driven to a particular location and are immobilised on four or more stabiliser legs to lift the wheels or other propulsion means entirely off the ground, and to ensure the upright slew axis is absolutely vertically aligned. From that fixed location the machine will move a load from one location to another location using a movements of the boom about the lateral and upright axes. As such, different stability considerations apply to machines in which a boom can also move about an upright axis. Therefore, different safety legislation, and consequently different safety systems, are employed on such machines.

In the illustrated embodiment, the operator cab 3 has a fixed angular orientation with respect to the front and/or rear axles $A_1$ and $A_2$.

Figure 2:
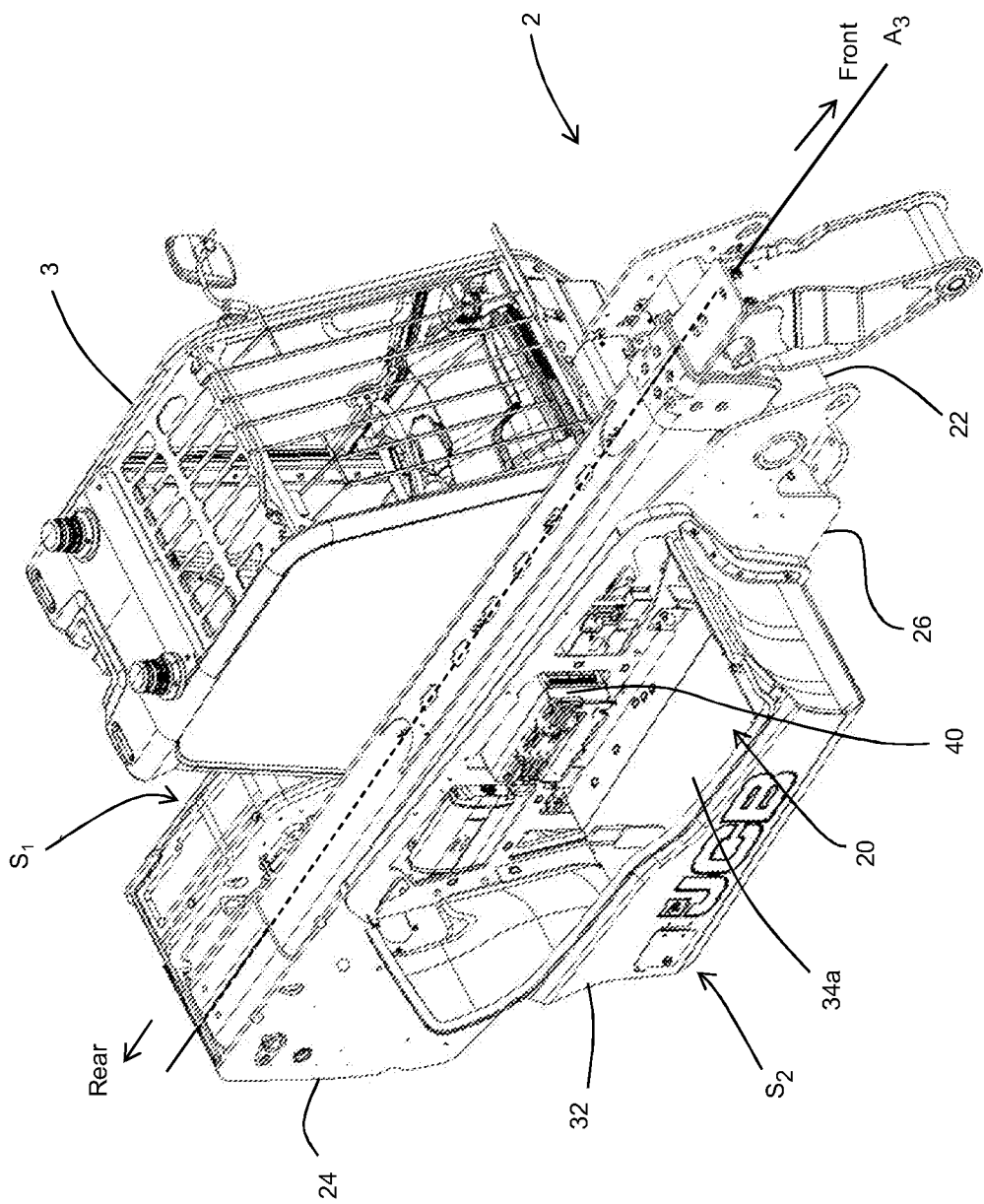
FIG. 2 is a perspective view of the machine body of the working machine of FIG. 1.
Figure 3:
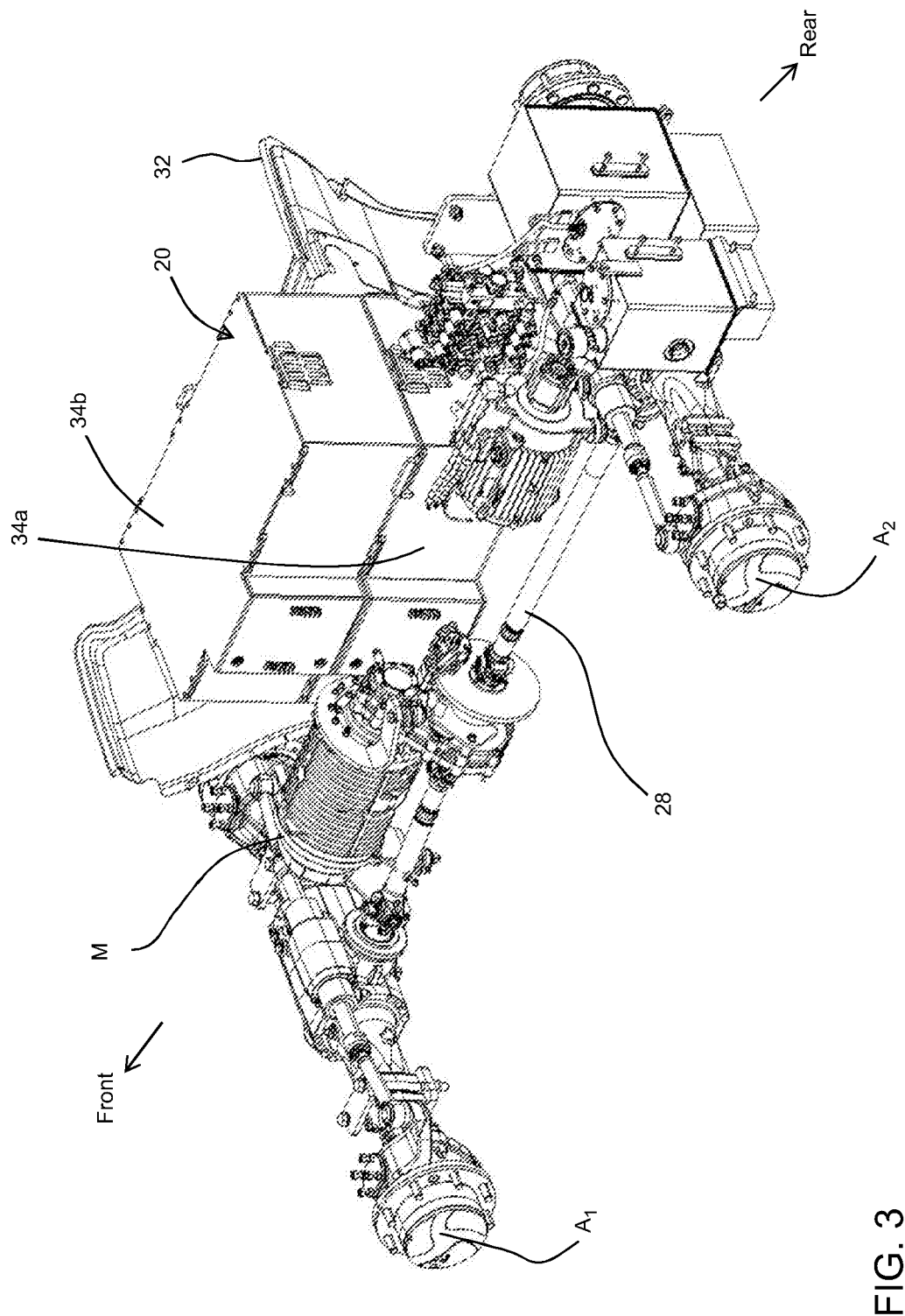
FIG. 3 is a cutaway perspective view of a section of the working machine of FIG. 1.
Figure 4:
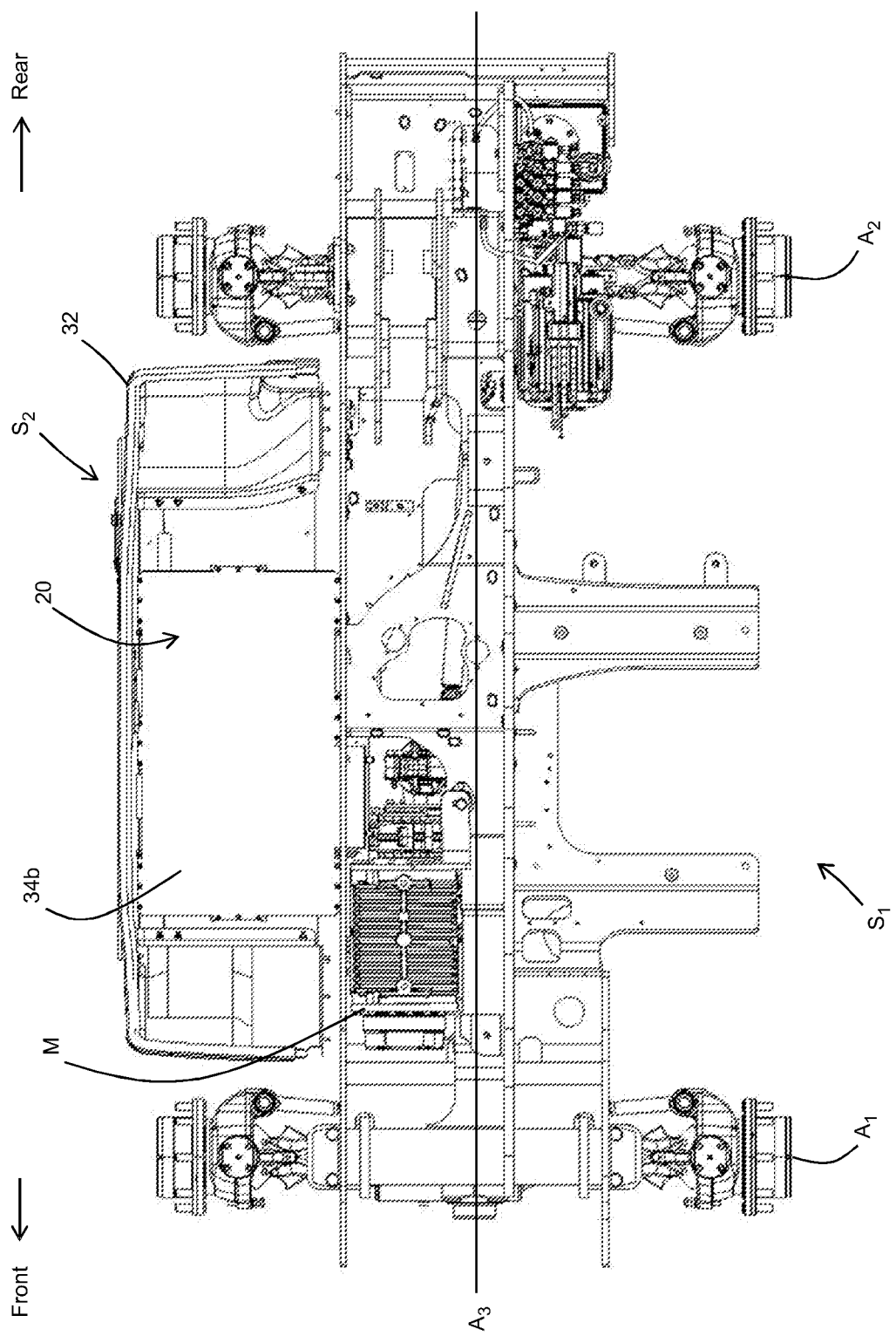
FIG. 4 is a top down cutaway view of the machine body of the working machine of FIG. 1.

With reference to the embodiment of FIGS. 2 to 4, the working machine 1 is an electric working machine having an electric energy storage unit 20 for providing electrical power to the working machine 1.

As shown in FIGS. 2 and 3, the working machine 1 has a longitudinal axis $A_3$. The operator cab 3 is located towards a first side $S_1$ of the working machine 1 with respect to the longitudinal axis $A_3$. The electric energy storage unit 20 is located towards a second side $S_2$ of the working machine 1, with respect to the longitudinal axis. The first and second sides $S_1$, $S_2$ are located opposite each other.

As referred to herein, the term "side" is used to mean a surface of the working machine that is not the top or bottom with respect to the normal orientation of the machine, and is not the front or back with respect to the direction of travel of the machine over ground.

The electric energy storage unit 20 acts as a ballast weight for the working machine 1. This is particularly advantageous when the working machine 1 is operated on uneven or inclined surfaces, and also when the lifting arm 6, 7 is extended.

The electric energy storage unit 20 is located so that it provides a counterweight or counter balance to the operator cab 3, with respect to the longitudinal axis $A_3$. In this way, the load on the working machine 1 is more evenly distributed.

In the exemplary embodiment of FIG. 2, the electric energy storage unit 20 and the operator cab 3 are positioned so that they are axially aligned with respect to the longitudinal axis $A_3$. In other words, the operator cab 3 and the electric energy storage unit 20 are positioned opposite each other with respect to the longitudinal axis $A_3$.

In some embodiments, electric energy storage unit 20 and the operator cab 3 are positioned so that they axially overlap with respect to the longitudinal axis $A_3$.

As can be seen most clearly from FIG. 4, the electric energy storage unit 20 is positioned between the front and rear axles $A_1$ and $A_2$ of the working machine 1. In the illustrated embodiment, the electric energy storage unit 20 does not extend beyond the position of the front and rear axles $A_1$ and $A_2$ in a direction parallel to the longitudinal axis $A_3$. Further, both the operator cab 3 and electric energy storage unit 20 are easily accessible in this location.

The operator cab 3 is also positioned between the front and rear axles $A_1$ and $A_2$. In the illustrated embodiment, the operator cab 3 does not extend beyond the position of the front and rear axles $A_1$ and $A_2$ in a direction parallel to the longitudinal axis $A_3$. In this way, the electric energy storage unit 20 and the operator cab 3 are positioned opposite each other with respect to the longitudinal axis $A_3$.

With reference to FIG. 2, the machine body 2 has a front 22, a rear 24, a first side $S_1$ and a second side $S_2$. The body 2 also includes a base 26 which, in normal use of the machine, faces the ground. The base 26 may extend, partially or entirely, between the front 22, rear 24, and/or sides $S_1$, $S_2$ of the machine 1. The electric energy storage unit 20 is located at or above the height of the base 26 with respect to the ground, when the working machine 1 is situated on flat ground. In other words, the electric energy storage unit 20 is positioned such that it is further from the ground than the base 26 of the machine 1, when the machine is situated on flat ground.

In the illustrated embodiment, the machine body 2 of the working machine 1 includes an enclosure 32 for housing the electric storage unit 20. In some embodiments, the enclosure 32 comprises a lid (not shown) for access to the electric energy storage unit 20.

In some embodiments, the enclosure does not have a lid. Access to the electric storage unit 20 may only be required by trained technicians, in which case, the electric storage unit 20 can be accessed without requiring the enclosure to have a lid.

Figure 5:
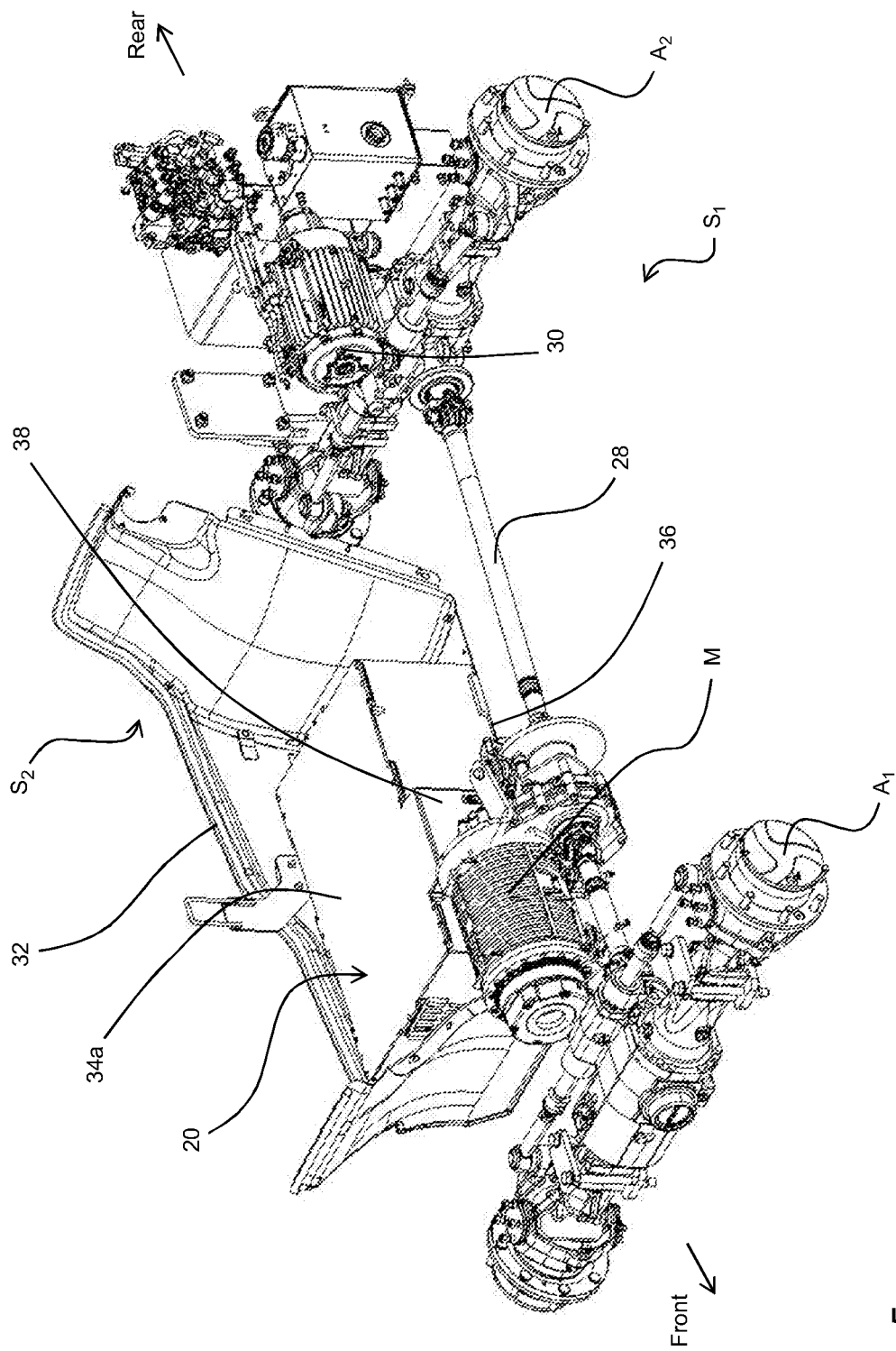
FIG. 5 is a perspective cutaway view illustrating the motors, driveshaft and axles of the working machine of FIG. 1.

As previously described, the working machine 1 includes an electric drive motor M configured to drive movement of one or both pairs of wheels 4, 5. With reference to FIG. 5, the motor M is coupled to a driveshaft 28 to drive movement of the wheels 4, 5. The working machine 1 also includes a separate hydraulic motor 30 configured to actuate the load handling apparatus 6, 7, e.g. to actuate the actuators 8, 10. The hydraulic motor 30 is positioned proximal the mount 9 of the load handling apparatus 6, 7.

Since two separate motors M, 30 are used to drive the driveshaft 28 and actuate the load handling apparatus 6, 7 respectively, the drive motor M can be much smaller than a diesel engine used on an equivalent diesel powered working machine. Consequently, the motor M can be positioned closer to the drive shaft 28, as compared to an equivalent diesel powered machine. Accordingly, a simpler coupling between the driveshaft 28 and motor M can be used.

In the illustrated embodiment, the drive motor M is positioned towards a side $S_2$ of the machine, with respect to the longitudinal axis. In the illustrated embodiment this is towards side on which the electric energy storage unit 20 is located.

In the illustrated embodiment, the drive motor M is positioned between the electric energy storage unit 20 and the operator cab 3. Further, the drive motor M is positioned between the operator cab 3 and the drive shaft 28. The drive motor M is also positioned such that a longitudinal axis of a transmission of the motor M is provided parallel to the driveshaft 28. This enables the use of a simpler coupling between the motor M and the driveshaft 28 than can be achieved when the motor is positioned perpendicular to the driveshaft 28.

In the illustrated embodiment, the longitudinal axis of the transmission of the drive motor M is provided above the horizontal plane of the axis of the drive shaft 28, when the machine is on a horizontal surface. The motor M is also offset from the vertical plane of the driveshaft 28, when the machine is on a horizontal surface, rather than being positioned directly above or below. In this way, a more compact arrangement is provided.

Further, in the illustrated embodiment, the drive motor M is positioned towards the front axle of the machine. In other words, the motor M is positioned off-centre with respect to the centre of the drive shaft 28, in a direction towards the front axle $A_1$.

In the illustrated embodiment, the hydraulic motor 30 is positioned towards a side $S_1$ of the machine, with respect to the longitudinal axis. In the illustrated embodiment this is towards side on which the operator cab 3 is located, i.e. the opposite side to the drive motor M. This may improve the balance of the machine.

In the illustrated embodiment, the hydraulic motor 30 is provided above the drive shaft 28, with respect to the normal orientation of the machine. This may protect the hydraulic motor 30 from damage or reduce the likelihood of damage.

The layout of the electric energy storage unit 20, the operator cab 3, the motor M and/or the hydraulic motor 30 enables the load distribution across the machine 1 to be optimised. This reduces the risk of the working machine tipping over, in particular when used on uneven or inclined surfaces and when the lifting arm 6, 7 is extended.

An equivalent diesel powered working machine includes a diesel engine, which is typically positioned as a counterweight to the operator cab. For example, such diesel machines often have an enclosure, corresponding to the enclosure 32 of the illustrated embodiment. In such a diesel machine, the diesel engine is located in the enclosure and provides a counterweight to the operator cab.

In an electric working machine 1, there is no diesel engine to provide ballast, and so the load distribution across the working machine 1 is impacted. By providing the electric energy storage unit 20 as a counterweight to the operator cab 3, the balance of load across the machine 1 is improved. For example, by placing the electric energy storage unit 20 in the enclosure 32 (i.e. where the diesel engine would typically be positioned in an equivalent diesel machine), the electric energy storage unit 20 acts as the counterweight to the operator cab 3, that would otherwise be provided by the diesel engine, and therefore improves the load distribution across the machine 1.

Providing the electric energy storage unit 20 in the enclosure 32 has the benefit of protecting the electric energy storage unit 20 against damage. If the battery were to be provided without an enclosure (e.g. mounted under the base of the machine body or at the rear of the machine), the electric energy storage unit 20 would be at greater risk of damage, for example by impact. In some embodiments, the electric energy storage unit 20 includes lithium ion batteries. Such batteries are prone to catching fire if damaged or subjected to heat. Due to chemical reactions in the battery, this can cause a self-sustaining fire as oxygen is produced in the reaction. Further, if a single electric energy storage module, comprising a lithium ion battery, is damaged, the heat can cause all the electric energy storage modules to ignite. Accordingly, providing protection for the electric energy storage unit 20 is advantageous for at least these reasons.

The electric energy storage unit 20 of the working machine 1 may include at least one electric energy storage module 34*a*, 34*b*. In FIG. 2, a working machine body 2 having one electric energy storage module 34*a*, 34*b* is illustrated. In FIG. 3, a section of a working machine body 2 having two electric energy storage modules 34*a*, 34*b* is illustrated.

It will be appreciated that working machines disclosed herein may include any number of electric energy storage modules 34*a*, for example 3, 4, 5, 6, 7, 8, 9, 10, or more electric energy storage modules 34*a*, 34*b*.

Each electric energy storage module 34*a*, 34*b* may be between 100 kg and 500 kg in weight, for example about 300 kg. It will be appreciated that each electric energy storage module 34*a*, 34*b* may be any suitable weight. The electric energy storage modules 34*a*, 34*b* may have different weights. The electric energy storage modules 34*a*, 34*b* make up the electric energy storage unit 20 of the machine 1.

Each electric energy storage module 34*a*, 34*b* may include a battery, or other suitable electric energy storage device, such as a capacitor or combination of battery and capacitor.

Each electric energy storage module 34*a*, 34*b* may have a predetermined power capacity. For example, each electric energy storage module 34*a*, 34*b* may have a power capacity in the range of 10 to 50 kWh, for example, 20 to 40 kWh, for example 24 kWh. Each electric energy storage module 34*a*, 34*b* may have the same or a different power capacity.

For example, where each electric energy storage module 34*a*, 34*b* has a power capacity of 24 kWh, the working machine 1 could be fitted with an electric energy storage unit 20 having either a 24 kWh or 48 kWh power capacity, depending on whether one or two electric energy storage modules 34*a*, 34*b* are fitted to the machine 1.

The working machine 1 comprises a mount 36 for mounting the one or more electric energy storage modules 34. For example, the mount 36 may be arranged for mounting at least a first electric energy storage module 34*a* and a second electric energy storage module 34*b* to the working machine 1. For example, the mount may be provided by the enclosure 32. The working machine is operable with at least one of the first and second electric energy storage modules 34*a*, 34*b* present.

In some embodiments, the first and/or second electric energy storage modules 34*a*, 34*b* are configured to be removable from the mount 36 and replaceable, such that the first and/or second electric energy storage modules 34*a*, 34*b* are interchangeable. In other words, the first and/or second electric energy storage module 34*a*, 34*b* may be removed from the working machine 1 and replaced with a new replacement electric energy storage module.

For example, where one of the first and/or second electric energy storage modules 34*a*, 34*b* runs out of charge, it can be removed and replaced with a fully charged electric energy storage module.

In some embodiments, the first and/or second electric energy storage modules are configured to be fixed to the machine, e.g. irremovably attached to the machine. In this way, swapping of the electric energy storage modules/electric storage unit is prevented.

In the illustrated embodiment, the electric energy storage modules 34*a*, 34*b* are mounted one on top of the other. It will be appreciated that any other suitable mounting arrangement may be used, for example the electric energy storage modules 34*a*, 34*b* may be mounted side by side.

The first and second electric energy storage modules 34*a*, 34*b* comprise a connector 38, e.g. a quick release connector, to connect the respective electric energy storage module 34*a*, 34*b* to the working machine 1, when the respective electric energy storage modules 34*a*, 34*b* are positioned on the mount 36.

The working machine e.g. the mount 36, comprises corresponding connectors 40, e.g. quick release connectors, for connection to the connectors 38 of the first and second electric energy storage modules 34*a*, 34*b*.

In some embodiments, no such connectors 38, 40 are provided and the first and second electric energy storage modules 34*a*, 34*b* are wired directly to the machine 1.

It will be appreciated that any suitable mechanism for coupling the first and second electric energy storage modules 34*a*, 34*b* to the working machine 1 may be used.

In some embodiments, the mount 36 is configured to receive a ballast module (not shown) in place of the first or second electric storage module 34*a*, 34*b*. For example, where only a single electric energy storage module 34*a* is fitted to the working machine 1, a ballast module may also be mounted on the working machine 1 to provide additional ballast weight to the machine. In this way, it is only necessary to provide an electric energy storage module 34*a* suitable for an intended use of the machine. Additional ballast weight can be provided by a separate ballast module, to improve the load distribution across the machine 1.

In some embodiments, the ballast module includes a connector, e.g. a quick release connector, to connect to the corresponding connectors 40 of the working machine. This acts to maintain the ballast module in position.

Since the working machine 1 can be fitted with one or more electric energy storage modules 34*a*, 34*b*, which may provide different power capacities, the electric energy storage unit 20 (i.e. the electric energy storage modules) can be selected and mounted on the machine 1 based on an intended use of the working machine 1. Consequently, where the intended use of the machine involves only low power requirements, a corresponding low capacity electric energy storage unit 20 can be provided. Conversely, where the intended use of the machine involves high power requirements, a corresponding high capacity electric energy storage unit 20 can be provided. This improves the cost effectiveness of the working machine 1.

Figure 7:
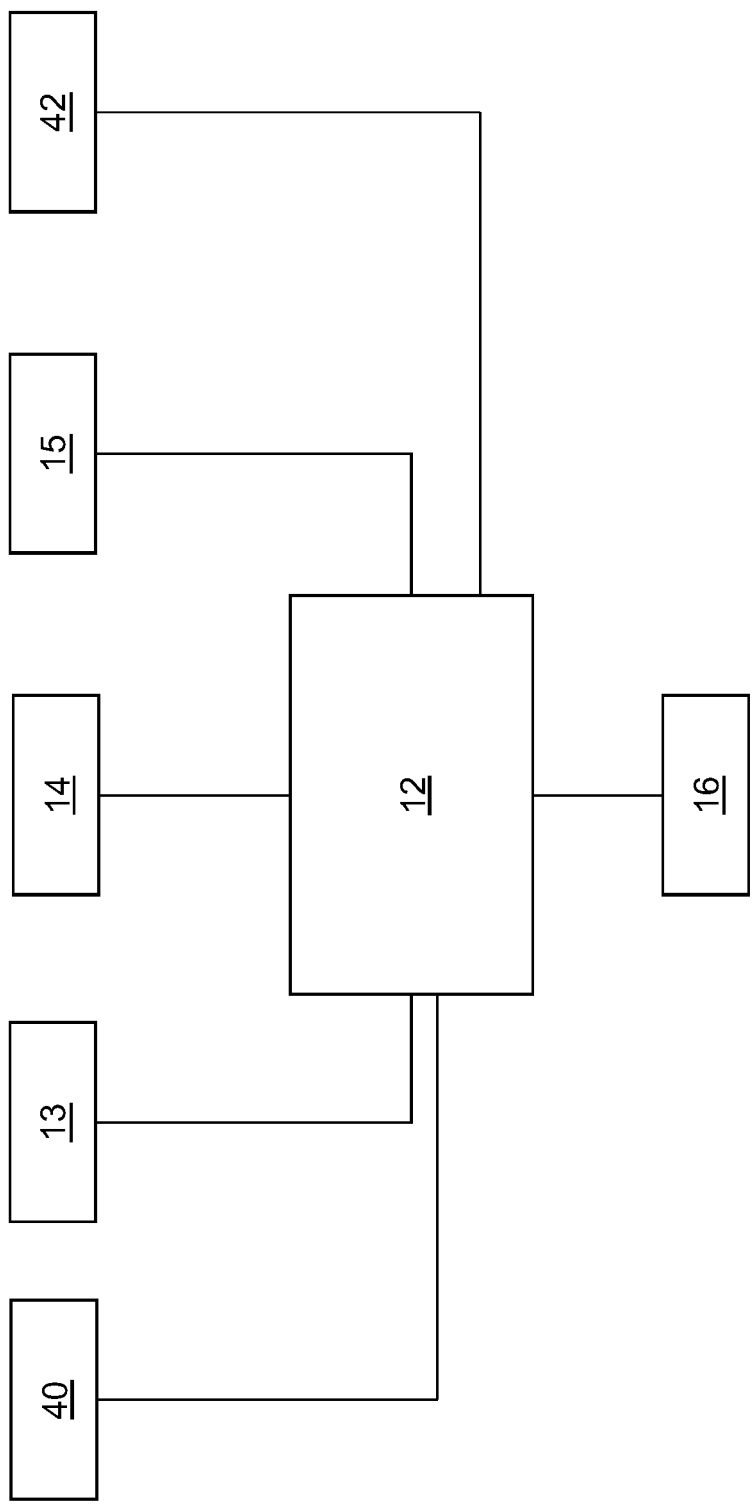
FIG. 7 is a schematic of a control system.

The working machine 1 includes a control system illustrated in FIG. 7. The control system includes a controller 12 configured to receive or acquire information representative of an attribute of the or each electric energy storage module 34*a*, 34*b* mounted on the machine 1. For example, the attribute may be the weight of the or each electric energy storage module 34*a*, 34*b*, a total weight of the electric energy storage modules 34*a*, 34*b* present, the power capacity of the or each electric energy storage module 34*a*, 34*b*, and/or a total power capacity of the electric energy storage modules 34*a*, 34*b* present. The attribute of the or each electric energy storage module 34*a*, 34*b* may be the position of the or each electric energy storage module 34*a*, 34*b* in the working machine, e.g. mount. The attribute may be an amount of charge in the or each electric energy storage module 34a, 34b.

In some embodiments, the controller is configured to receive or acquire information representative of one or more attributes of the or each electric energy storage module 34a, 34b present.

As will be explained in further detail below, the controller is configured to determine permitted and/or prohibited operations of the working machine based on the received or acquired attribute information. The controller is further configured to issue an operations signal for use by at least one element of the working machine 1 corresponding to the determined permitted and/or prohibited operations.

In the illustrated embodiment, the controller 12 is configured to read information from the or each electric energy storage module 34a, 34b indicative of attributes (e.g. weight) of the respective module 34a, 34b, when the electric energy storage module 34a, 34b is connected to the machine 1. This may be achieved via any suitable connection arrangement, as will be understood by those skilled in the art, e.g. via connectors 38, 40. In exemplary embodiments, the controller is configured to determine the power capacity of the electric energy storage module 34a, 34b and from this determine its weight.

In some embodiments the control system includes an RFID sensing arrangement 42, e.g. an RFID detector. The or each ballast module may also have an RFID transmitting arrangement configured to transmit a signal representative of one of more attributes of the or each ballast module, e.g. weight and/or position of the ballast module. The RFID sensing arrangement 42 of the control system is configured to receive such signals.

The RFID sensing arrangement 42 is configured to issue a signal to a controller 12 such that the or each attribute of the or each ballast module can be determined by the controller.

Additionally or alternatively, the working machine may include a load sensor configured sense a parameter which is representative of a weight distribution of the machine, e.g. a lateral weight distribution of the machine. The controller may be configured to determine the weight and/or position of the at least one electric energy storage module and/or ballast module, based on information received from the load sensor.

Additionally or alternatively, the working machine may include a load sensor configured to sense a parameter which is representative of a weight mounted on the working machine mount 36. The controller may be configured to determine the weight and/or position of the at least one electric energy storage module and/or ballast module, based on information received from the load sensor.

In some embodiments, the machine 1 includes an inclinometer, e.g. on the load handling apparatus 6, 7. Based information received from the inclinometer, the controller can determine the weight distributed across the machine, irrespective whether the machine is positioned on a flat or inclined surface.

In use, the controller is configured to receive or acquire information representative of one or more attributes of the or each electric energy storage module 34a, 34b present, and one or more attributes of a ballast module if present, for example, upon start-up of the machine.

As will be described in further detail below, the controller includes a machine stabilisation decision logic, configured to maintain stability of the working machine 1. The information representative of the weight and/or position of the at least one electric energy storage module 34a, 34b, and ballast module if present, is an input to the stabilisation decision logic. The determined permitted and/or prohibited operations of the working machine are determined based on the stabilisation decision logic.

The stabilisation decision logic is configured such that the permitted load of the load handling apparatus and/or the permitted lift height of the load handling apparatus is dependent on the attribute of said electric energy storage unit, and ballast module if present. For example, the permitted load of the load handling apparatus and/or the permitted lift height of the load handling apparatus is lower for a lower weight of electric energy storage unit and ballast module present, and is higher for a higher weight of electric energy storage unit and ballast module present.

When the machine 1 lifts a load L supported by the load handling implement 11, the load L (and implement 11) will produce a moment about an axis of the machine 1 which causes the machine to tend to tilt about that axis. The moment is, therefore, referred to herein as a moment of tilt. In the depicted example, this axis of the machine 1 about which the machine 1 is likely to tilt is axis C—i.e. about the first (or front) axle $A_1$.

A tilt sensing arrangement 13 (see FIG. 7) is provided and is configured to sense a parameter which is representative of a moment of tilt of the machine 1 about an axis.

The tilt sensing arrangement 13 is further configured to issue a signal to a controller 12 such that a moment of tilt of the machine about an axis can be determined. In an embodiment, the tilt sensing arrangement 13 includes a strain gauge coupled to an axle $A_1$, $A_2$ of the machine 1. In an embodiment, the tilt sensing arrangement 13 includes a load cell located between the machine body 2 and an axle and configured to sense the load (or weight) on the axle. The tilt sensing arrangement 13 may be coupled to or otherwise associated with the second (or rear) axle $A_2$.

The tilt sensing arrangement 13 may, in an embodiment, include several sensors which sense different parameters and use these parameters to generate a signal such that a moment of tilt of the machine 1 can be determined.

The tilt sensing arrangement 13 may take other forms, as will be appreciated.

An orientation sensor arrangement 14 (see FIGS. 1, 6 and 7) is also provided and is configured to sense a parameter representative of a position of at least a portion of the load handling apparatus 6, 7 with respect to a reference orientation. For example, this reference orientation may be horizontal ground H (a horizontal reference datum), the direction of the force due to gravity G (a vertical reference datum and hereinafter referred to as "gravity"). In other words, the orientation sensor arrangement senses the absolute orientation of the load handling apparatus 6, 7 in space, rather than its position relative to another body, such as the machine body 2. For example, this may be an angle of the load handling apparatus 6, 7 with respect to gravity G (an absolute vertical orientation) or an angle with respect to horizontal ground H (an absolute horizontal orientation) irrespective of the inclination of the machine body 2.

In some embodiments, the orientation sensor arrangement 14 (see FIGS. 1, 6 and 7) is configured to sense a parameter representative of a position of at least a portion of the load handling apparatus 6, 7 with respect to the machine body 2 itself, i.e. the reference orientation is the orientation of the machine body 2.

The orientation sensor arrangement 14 is further configured to issue a signal to the controller 12 representative of an orientation of at least a portion of the load handling apparatus 6, 7 with respect to the reference orientation.

The orientation sensor arrangement 14 may be an accelerometer or gyroscope 14 mounted to or otherwise associated with the load handling apparatus 6, 7 and configured to change its output signal by movement of the load handling apparatus 6, 7 with respect to the machine body 2 and by a change in inclination of the machine body 2 with respect to the reference orientation H, G. In practical terms the accelerometer 14 is a solid state electronic sensor that senses its orientation with respect to gravity G. However, since horizontal ground H can be assumed to be normal to gravity G, the controller 12 or accelerometer 14 is able to convert an orientation with respect to gravity G into an orientation with respect to horizontal ground H. For ease of understanding, the present teachings are described taking the reference orientation as being horizontal ground H.

In alternative embodiments, the orientation sensor arrangement 14 may include an accelerometer mounted to the machine body 2 to sense the inclination of the machine body 2 with respect to the reference orientation H and a sensor configured to measure the position of the load handling apparatus 6, 7 with respect to the machine body 2. Alternatively, the orientation sensor arrangement 14 may include a sensor configured to measure the position of the load handling apparatus 6, 7 with respect to the machine body 2. The sensor configured to measure the position of the load handling apparatus 6, 7 with respect to the machine body 2 may be a potentiometer mounted proximate to the pivot B with one portion fixed to the machine body 2 and a separate moveable portion fixed to the load handling apparatus 6, 7. As the load handling apparatus 6, 7 moves and its position changes with respect to the machine body 2, the resistance of the potentiometer changes to provide a signal that can be related to the position—e.g. the resistance may be proportional to the angle of the load handling apparatus 6, 7 with respect to the machine body 2.

Alternatively, the position sensor may be a series of markings on a part of the lifting actuator 10 and a reader configured to detect the or each marking. The lifting actuator 10 may be arranged such that extension of the lifting actuator 10 causes one or more of the series of markings to be exposed for detection by the reader. If the position of the markings on the actuator 10 is known, then the extension of the lifting actuator 10 can be determined. The absolute orientation of the load handling apparatus 6, 7 may then be derived by summing the absolute orientation of the machine body 2 with respect to the reference orientation H, G and the relative position of the load handling apparatus 6, 7 with respect to the machine body 2.

It will be appreciated that other orientation sensor arrangements are possible, for example a string potentiometer.

In an embodiment, the orientation sensor arrangement 14 is configured to issue a signal representative of an angle of a lifting arm 6, 7 of the load handling apparatus 6, 7 with respect to the reference orientation H, G. In an embodiment, this signal may be the absolute angle of the lifting arm 6, 7 with respect to the reference orientation H, G.

A controller 12 (see FIGS. 1, 6 and 7) is provided which is configured to receive a signal from the tilt sensing arrangement 13 and the orientation sensor arrangement 14—these signals being representative of a moment of tilt of the machine 1 and an absolute orientation of the load handling apparatus 6, 7. The controller 12 is also configured to read information representative of one or more attributes of (e.g. weight and/or position) of the electric energy storage unit 20 directly from the electric energy storage modules 34a, 34b. The controller 12 may also be configured to receive a signal from the RFID sensing arrangement 42 indicative of one or more attributes of a respective ballast module if present. The controller 12 may be any suitable microprocessor type controller and the signals may be transmitted by any suitable wired or wireless communication system or protocol, such as via a CAN bus of the machine 1.

In some embodiments, the controller 12 is configured to receive a signal from the tilt sensing arrangement 13 and to read information representative of one or more attributes of the electric energy storage modules 34a, 34b directly from the respective module when connected to the machine—these signals being representative of a moment of tilt of the machine 1 and an attribute (e.g. weight and/or position) of the electric energy storage unit 20, respectively. The controller 12 may also be configured to receive a signal from the RFID sensing arrangement 42 indicative of one or more attributes of a respective ballast module if present. In such embodiments, an orientation sensor arrangement 14 is not required.

The controller 12 is coupled to at least one actuator 8, 10 which controls at least one movement of the load handling apparatus 6, 7 with respect to the machine body 2. The controller 12 is configured to issue a signal to stop or restrict (e.g. slow to a velocity lower than the desired velocity that is input by a machine operator) a movement of the load handling apparatus 6, 7 when a condition or conditions are met—as described below.

The controller 12 may also or alternatively be coupled to an operator display unit (not shown), configured to display information indicative of permitted and/or prohibited operations of the working machine 1.

In some embodiments, the controller is configured to determine the operational limits of the working machine 1 in terms of lateral tilt limits. From this, prohibited and/or permitted operations for a given load and/or for a given electric energy storage unit 20 weight and/or position (and a given ballast module weight and/or position, if present), can be determined by the controller.

In some embodiments, the permitted and/or prohibited operations, in terms of longitudinal and/or lateral tilt limits are determined by the controller and a corresponding signal sent to the operator display unit, which visually indicates the permitted and/or prohibited operations to a user. For example, such visualisation may be in the form of a load chart and/or corresponding visual indications (pendulum indicators) for a machine operator that indicate the orientation of the load handling apparatus and thus related permissible loads for the machine with respect to an absolute orientation, typically level ground.

When a load L is supported by the load handling implement 11, the weight of the load L is counterbalanced by the weight of the machine 1. However, if the moment of tilt increases, the machine 1 may become unstable as the weight on the second axle decreases—i.e. the machine 1 may tip about axis C.

The extent to which the load L is counterbalanced by the weight of the machine 1 will clearly depend on the weight of the machine 1. In particular, the extent to which the load L is counterbalanced depends on the weight and/or position of the electric energy storage unit 20 (i.e. the electric energy storage modules present) and the weight and/or position of any ballast modules present.

The controller 12 of the machine 1 is configured to receive a signal indicative of the moment of tilt—which may, for example, be the load (or weight) on the second (or rear) axle $A_2$. In addition, the controller 12 is configured to receive a signal indicative of an orientation of the load handling apparatus—for example the angle of the lifting arm 6, 7 with respect to the reference orientation H, G—e.g. horizontal ground H. Also, the controller 12 is configured to receive or acquire information indicative of the weight and/or position of the electric energy storage unit 20 (i.e. the electric energy storage modules 34a, 34b present) and the weight and/or position of any ballast modules present.

With reference to FIG. 1 the vectors depicting the path of the load at positions X, Y and Z are shown by arrows $V_x$, $V_y$, and $V_z$. The x and y components of these vectors are denoted by the dotted lines forming a right angle triangle with each arrow with the x component being parallel to horizontal ground H and the y component being parallel to gravity G. Thus it can be seen that at position X of the load handling apparatus 6, 7 the negative x component of the vector is greater for a given negative y component, than at position Y, and at position Z there is a small positive x component for a given negative y component. Therefore, at position X, for a given angular velocity of the load handling apparatus, there is a greater negative linear velocity of the load L in axis x. In this embodiment in practical terms this means that the load moves forward faster when lowering the load handling apparatus from larger angles than smaller angles. In turn this means that the tipping moment relative to the axis C is increasing at a faster rate and consequently the longitudinal or forward inertia that would be generated in the load L and load handling apparatus 6, 7 if there is an abrupt cessation of movement (i.e. the operator suddenly stops lowering the load L) is greater in position X than in positions Y and Z.

Thus, to counteract this issue, one measure is to require a greater threshold load on the second axle $A_2$ to provide a suitable safety margin in all operating conditions. The threshold load required to provide a suitable safety margin will depend on the weight and/or position of the electric energy storage unit 20 and ballast modules mounted on the machine 1. Accordingly, the controller 12 is configured to determine a suitable threshold based on the information received or acquired indicative of the weight and/or position of the electric energy storage unit 20 and ballast modules mounted on the machine 1.

For example, the controller 12 may include a first threshold value or set of threshold values for when the determined weight is in a first range, and a second threshold value or set of threshold values for when the determined weight is in a second range. The sets of threshold values used when the weight is determined to be in the first or second range may generally follow the same principles as discussed below. The threshold value(s) used when the determined weight is in a first range may be higher than the threshold value(s) used when the determined weight is in a second range, wherein the first range is higher than the second range.

The controller 12 may issue a signal or command to restrict or substantially prevent a movement of the load handling apparatus 6, 7 if, for example, the signal representative of the moment of tilt is close to or is approaching the threshold value. In this case, the orientation sensor arrangement 14 may be not required.

Such a safety margin may be excessive in positions Y and Z (as shown on FIG. 1), and so the machine 1 may be prevented from carrying out operations that are safe in these positions if such a threshold is present. As such the productivity of the machine for carrying out certain operations may be reduced.

In an embodiment (see FIG. 8 for example), the controller 12 includes a first and a second stored threshold value $TV_1$ and $TV_2$—the first and second threshold values being different. Both the first and a second stored threshold value $TV_1$ and $TV_2$ are determined based on the attribute information received or acquired, which is indicative of the weight and/or position of the electric energy storage unit 20 and ballast modules mounted on the machine 1.

When the signal representative of an orientation of the load handling apparatus 6, 7 indicates that the load handling apparatus 6, 7 is in a first orientation with respect to the horizontal ground H, the controller compares the signal representative of the moment of tilting with the first threshold value $TV_1$. The controller 12 may then issue a signal or command to restrict or substantially prevent a movement of the load handling apparatus 6, 7 if, for example, the signal representative of the moment of tilting is close to or is approaching the first threshold value $TV_1$.

When the signal representative of an orientation of the load handling apparatus 6, 7 indicates that the load handling apparatus 6, 7 is in a second orientation with respect to horizontal ground H, the controller compares the signal representative of the moment of tilting with the second threshold value $TV_2$. The controller 12 may then issue a signal or command to restrict or substantially prevent a movement of the load handling apparatus 6, 7 if, for example, the signal representative of the moment of tilting is close to or is approaching the second threshold value $TV_2$.

Restricting or substantially preventing a movement of the load handling apparatus 6, 7 may include, for example, restricting or stopping the flow of hydraulic fluid into and out of a movement actuator such as the lifting actuator 10. In an embodiment, restricting or substantially preventing a movement of the load handling apparatus 6, 7 includes restricting or substantially preventing a movement of the load handling apparatus 6, 7 in one or more directions. In an embodiment in which the load handling apparatus 6, 7 includes a lifting arm 6, 7, restricting or substantially preventing a movement of the lifting arm 6, 7 may prevent lowering of the arm 6, 7 but may allow raising and/or retraction of the lifting arm 7. In a further embodiment, restricting movement of the load handling apparatus may further include restricting the forward or reverse motion of the machine 1 as a whole.

Thus, the threshold value which is used for the comparison by the controller 12 is dependent on the orientation of the load handling apparatus 6, 7. This dependency may take many different forms—see below.

Restricting or substantially preventing a movement of the load handling apparatus 6, 7 is intended to seek to reduce the risk of the machine tipping by preventing or restricting a movement which would otherwise tip—or risk tipping—the machine 1. The use of a threshold value $TV_1$ $TV_2$ which is dependent on an orientation of the load handling apparatus 6, 7 is intended to seek to avoid restricting movement of the load handling apparatus 6, 7 needlessly when there is little or no risk of tipping the machine 1 or moving out of safety limits.

The restriction or substantial prevention of a movement of the load handling apparatus 6, 7 may include, for example, the progressive slowing of a movement of at least a part of the load handling apparatus 6, 7—for example, slowing the speed of movement of a lifting arm 6, 7 to a stop.

In an embodiment, the first and second threshold values $TV_1$ and $TV_2$ are selected dependent on the orientation of the load handling apparatus 6, 7. A single threshold value may apply to several different orientations of the load handling apparatus 6, 7 with respect to horizontal ground H. The threshold values may be proportional to or substantially proportional to an orientation of the load handling apparatus 6, 7 with respect to horizontal ground H—for example, an angular orientation of a lifting arm 6, 7 of the load handling apparatus 6, 7 with respect to horizontal ground H (see FIGS. 5 and 6). The proportional or substantially proportional dependency of the threshold value on the orientation of the load handling apparatus 6, 7 may be limited to a range of orientations of the load handling apparatus 6, 7 (see FIG. 6) or may be over the entire range of permitted or possible orientations of the load handling apparatus 6, 7 (see FIG. 5).

For example, the machine 1 may have a load handling apparatus 6, 7 which includes a lifting arm 6, 7 and orientation sensor arrangement 14 may include a sensor configured to sense the angle of the lifting arm 6, 7 with respect to horizontal ground H (or a parameter representative of the angle of the lifting arm 6, 7). The threshold value used by the controller 12 may be selected dependent on the angle of the lifting arm 6, 7 with respect to horizontal ground H. A first threshold value $TV_1$ may be used for angles below a lower limit and a second threshold value $TV_2$ may be used for angles above an upper limit. If the lower and upper limits are at different angles, then a variable threshold value may be used between the upper and lower limits (the variable threshold value may be proportional to the orientation of the lifting arm 6, 7). The first threshold value $TV_1$ is preferably lower than the second threshold value $TV_2$.

In an embodiment, there is a plurality of threshold values each with a respective load handling apparatus orientation associated therewith. The threshold values and associated load handling apparatus orientations may be stored in a lookup table which can be accessed by the controller 12.

In an embodiment, the tilt sensing arrangement 13 senses a parameter which is representative of the weight on the second (or rear) axle $A_2$ of the machine 1. In exemplary embodiments, the tilt sensing arrangement 13 comprises a strain gauge configured to measure an amount of flex in the second axle, which can then be correlated to an amount of load on the second axle e.g. by comparison with a database.

The weight on the second axle depends on the total weight of the machine. In exemplary embodiments, the machine may weigh between 4000 kg and 11000 kg, for example between 5000 kg and 8000 kg, for example 5500 kg. In the case where the machine is 5500 kg, a typical load on the second axle of the machine 1 is in the range of 2000 kg to 3000 kg when the machine is unladen and when two electric energy storage modules 34a, 34b are mounted on the machine. When only a single electric energy storage module 34a is mounted on the machine, the load on the second axle may be less, for example 100-500 kg less.

When two electric energy storage modules 34a, 34b are mounted on the machine, in exemplary embodiments, a first threshold value for the controller 12 is selected to be about 250-1000 kg, e.g. 500 kg, for lifting arm angles with respect to the horizontal (with the machine in an typical orientation) of less than about 30° (or less than about 20°-25° in another example), a second threshold value is selected to be higher than the first threshold value, for example about 1500-5000 kg, e.g. 3500 kg, for lifting arm angles with respect to the horizontal of greater than about 45° (or greater than about 40° in another example). The threshold value for any angles between these angles (e.g. between 30° and 45° in one example) may be proportional or substantially proportional to the angle such that there is a substantially linear progression of the threshold value for a given angle from the first to the second threshold value between the specified angles (e.g. between 30° and 45° in one example).

The threshold values used for a particular machine will be dependent on the machine characteristics. For example, the threshold values may be dependent on the geometry of the machine, the mass or weight of the machine, the geometry and mass of the load handling apparatus 6, 7 and the layout of the machine. Further, for machines in which the load handling apparatus 6, 7 is telescopically extendible, a given angular velocity will result in a differing x and y component of linear velocity dependent upon the extension of the load handling apparatus. As such an extension sensor arrangement (not shown) may also signal the controller and the controller may adjust the threshold value according to the extension. The threshold values are selected in an attempt to prevent tipping of the machine during operation.

It will be appreciated that the selection of a threshold value for the moment of tilt dependent on the orientation of the load handling apparatus 6, 7 allows the machine 1 to operate safely within a full range of movement.

Figure 8:
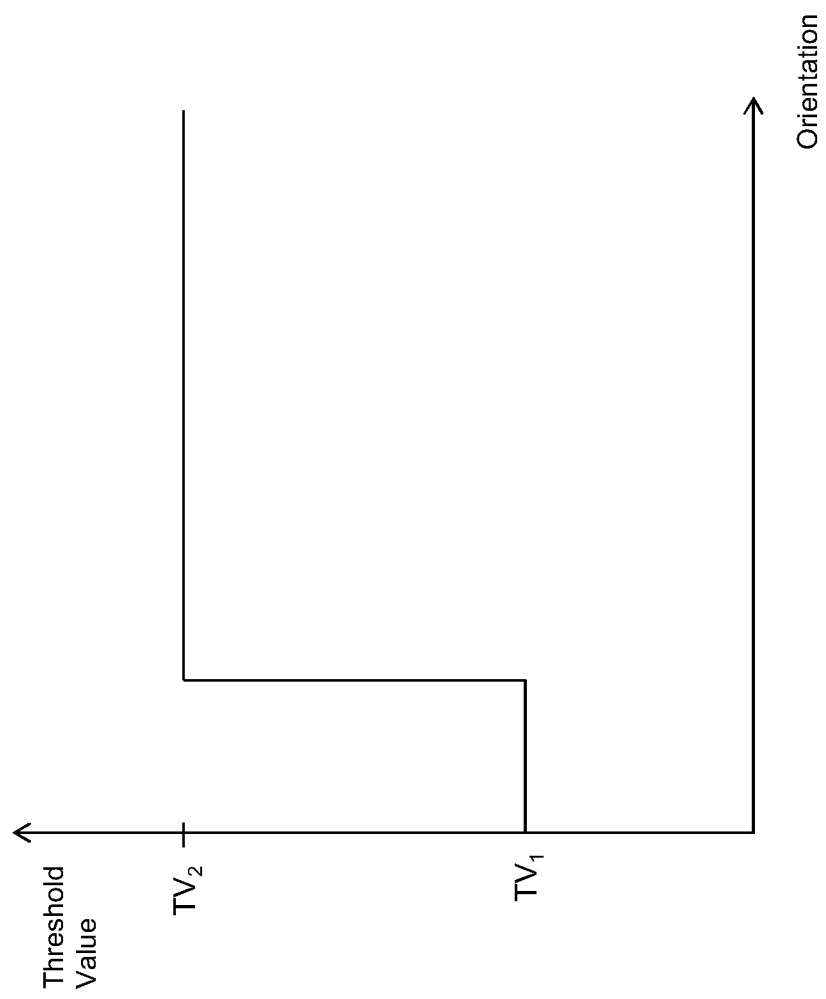
FIGS. 8, 9 and 10 are charts illustrating relationships between load handling apparatus orientation and threshold value.
Figure 9:
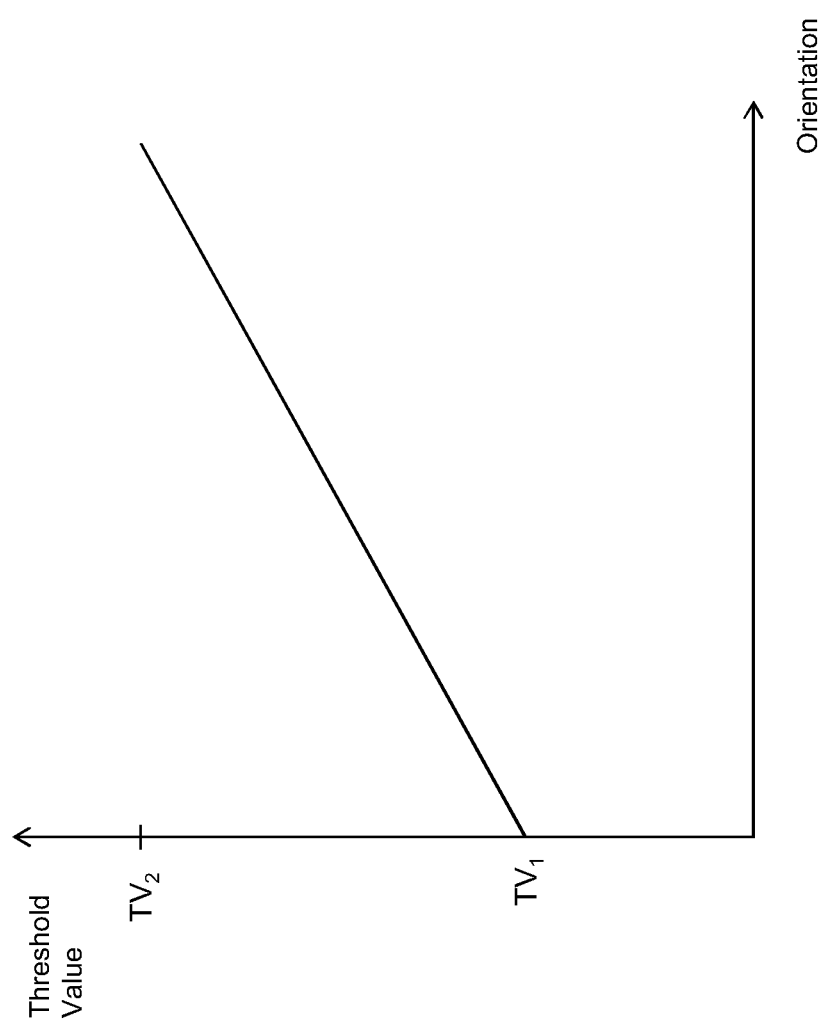
Figure 10:
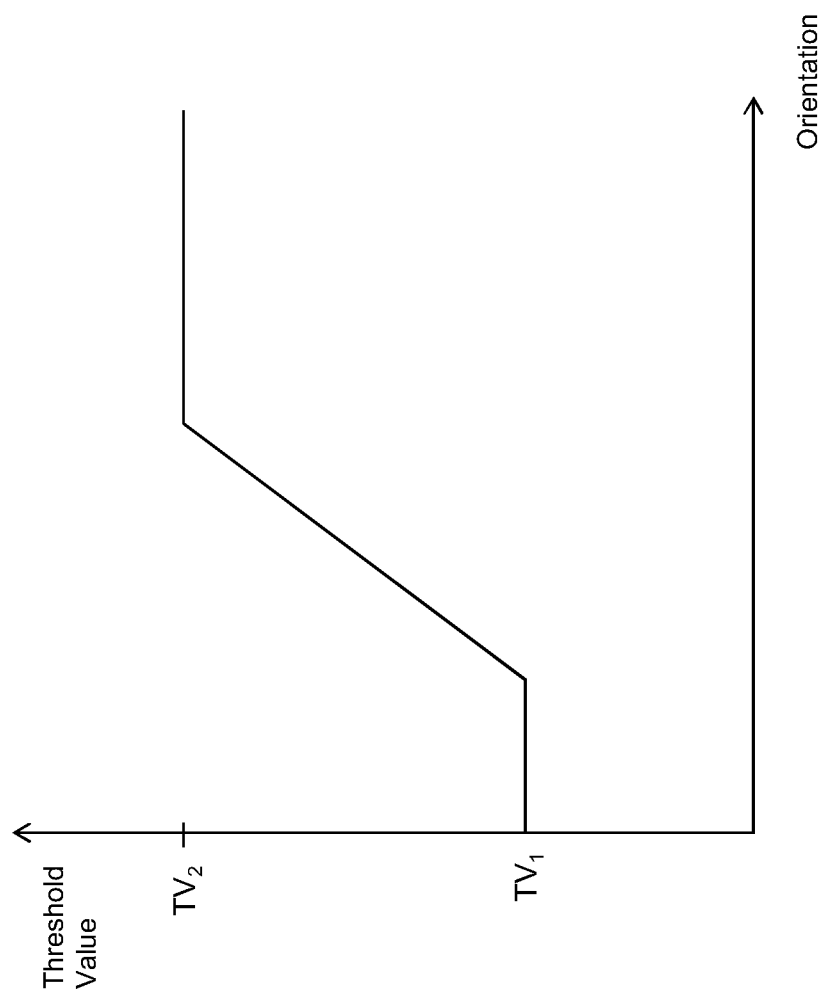
Figure 11:
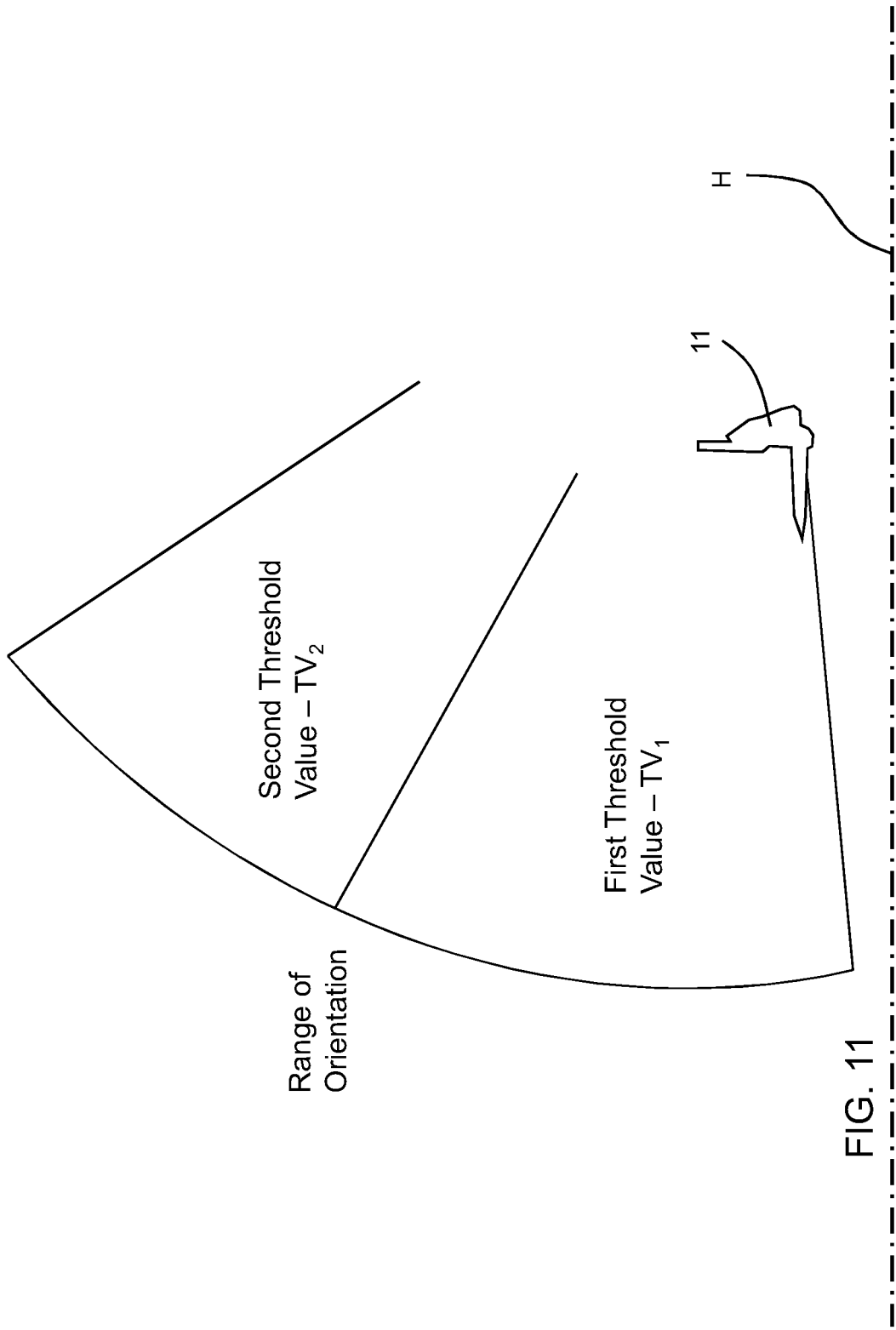
FIG. 11 is a diagram illustrating the relationship of orientation of a load handling apparatus to a threshold value for the chart of FIG. 8.

FIGS. 8 to 10 show a selection of examples of possible threshold values for different load handling apparatus orientations. In FIG. 9, the threshold value is proportional to the orientation of the load handling apparatus 6, 7. In FIG. 10, a first threshold value $TV_1$ is used for a first range of orientations of the load handling apparatus 6, 7, a second threshold value $TV_2$ is used for a second range of orientations of the load handling apparatus 6, 7, and the threshold value used for a given orientation of the load handling apparatus 6, 7 between the first and second ranges varies in proportion to the orientation of the load handling apparatus 6, 7. The proportional relationship may be directly proportional or proportional in accordance with a trigonometric function (such as a tangential function) or other mathematical relationship for example. In FIG. 8, a first threshold value $TV_1$ is used for a first range of orientations of the load handling apparatus 6, 7, a second threshold value $TV_2$ is used for a second range of orientations of the load handling apparatus 6, 7. FIG. 11 is another representation of the relationship shown in FIG. 8 in the specific example of a load handling apparatus 6, 7 comprising a lifting arm 6, 7 which can move (about pivot B) with respect to the machine body 2 over a range of possible angles—with a first threshold value $TV_1$ being used over a first range of angular movement and a second threshold value $TV_2$ being used over a second range of angular movement.

As depicted in FIG. 1 it is apparent that the actual ground upon which the machine is supported is level or horizontal (i.e. normal to gravity G). The operating instructions of machines 1 of the type described in these teachings typically indicate that lifting and lowering operations of the type described should be undertaken on horizontal ground only.

However, it is sometimes the case that operators are unaware of, or choose to disregard, such instructions and manipulate loads with the machine 1 stood on inclined surfaces. Such a risk is heightened for machines of the type described—i.e. off-highway working machines including telescopic handlers, skid-steer loaders, compact track loaders, wheel loaders, or telescopic wheel loaders—since such machines are typically capable of working off-road in construction, agricultural or military environments, As such they are typically equipped with one or more of the following features: deep treaded tyres, tracks, high ground clearance to the machine body, steep approach and departure angles, limited slip differentials, locking differentials and drive to all wheels or tracks to improve their traction and ability to drive up and crest inclines.

Figure 6:
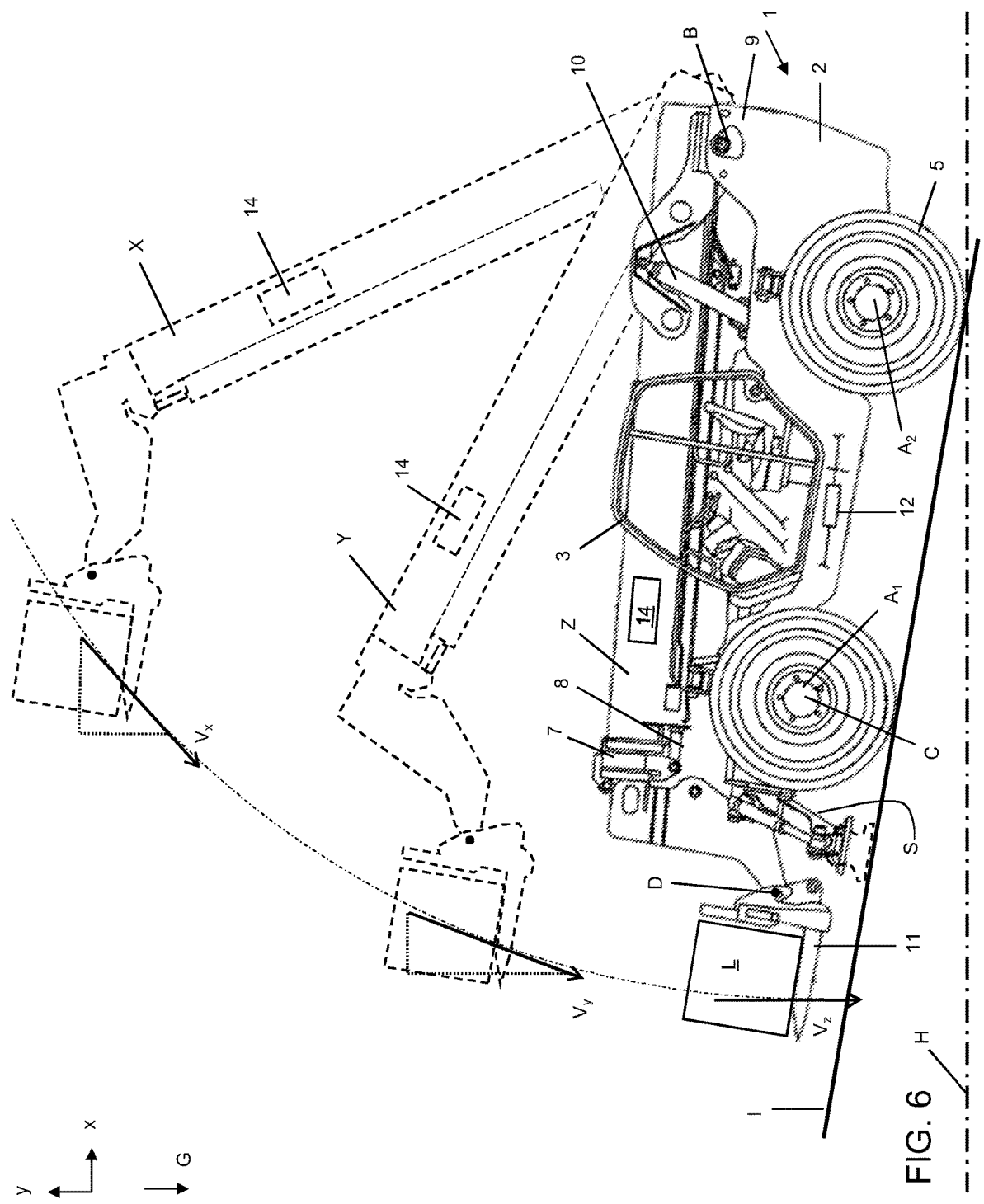
FIG. 6 is a side view of the working machine of FIG. 1 on an inclined surface.

FIG. 6 depicts the machine 1 on an upwardly inclined surface I of approximately 10 degrees, and with the load handling apparatus 6, 7 inclined to the same position as depicted in FIG. 1 relative to the machine body 2, but at orientations of approximately 65 degrees, 37 degrees and 5 degrees with respect to horizontal ground H.

By a comparison of FIGS. 1 and 6 it can be seen that the negative x component of the vectors $V_x$ and $V_y$ is now greater due to the incline of the machine. In the case of the component at position Y, the negative x component is approximately twice as large as in FIG. 1.

The reverse is applicable if the machine 1 is operated on a downwardly inclined surface.

As such, the benefit of sensing an absolute orientation of the load handling apparatus 6, 7 can be appreciated since it enables the threshold values to be based on an accurate measure of the forward component of the movement vector of the load L, irrespective of the inclination of the machine 1. To some extent variations in the tilt sensing arrangement 13 caused by an incline compensate for inaccuracies in threshold value calculations if they are based on the relative position of a load handling apparatus 6, 7 to a machine body 2. Nevertheless, sensing the absolute orientation of the load handling apparatus 6, 7 permit a more refined system overall, that allows for greater machine productivity.

A further benefit of measuring an absolute orientation of the load handling apparatus 6, 7 is that accelerometers utilised for such measurements can have no moving parts and can be mounted in a variety of locations on the load handling apparatus that can be selected to be away from areas prone to damage. This is in contrast to potentiometers that are typically used for relative measurement of a load handling apparatus which inevitably comprise moving parts and must be mounted where the load handling apparatus 6, 7 is mounted to the machine body 2 where it may be more prone to damage.

It will be appreciated that as a load L is lowered and moves forward with respect to the machine body 2, the proportion of that load transmitted to the ground at a rearward end of the machine 1 reduces and the proportion transmitted at the forward end increases. For example, for machines having two wheels 4 mounted on a front axle $A_1$ and two wheels 5 mounted on a rear axle $A_2$, progressively more weight will be transmitted via the two front wheels 4 and progressively less via the rear wheels 5 during lowering. In particular, but not exclusively, for wheels fitted with pneumatic tyres, this load transfer will tend to cause the front tyres to compress slightly and the rear tyres to expand slightly. If the machine 1 is stood on a compressible surface such as earth, it may also cause the front wheels to sink into the surface to some degree. As a result, the machine body may tilt forwards as a result of the lowering. A further benefit of sensing absolute orientation is that such movements caused by this load transfer are also corrected for.

A still further benefit of measuring absolute orientation is that this provides a closer correlation to manual load charts and corresponding visual indications (pendulum indicators) for a machine operator that are often mounted on to a load handling apparatus and indicate the orientation of the load handling apparatus and thus related permissible loads for the machine with respect to an absolute orientation, typically level ground.

In an embodiment, the machine 1 includes one or more stabilisers S which may be extended (deployed) or retracted from the machine body 2. The or each stabiliser S preferably extends from a part of the machine body 2 which is towards the load handling implement 11 of the machine 1. There are preferably two stabilisers S and each stabiliser is preferably located adjacent to a wheel which is coupled to the first (or front) axle.

The or each stabiliser S is configured to be extended such it makes contact with a ground surface (as depicted in broken lines in FIGS. 1 and 6) and restricts movement of the machine 1 about an axis (for example axis C) which may be induced by the moment of tilt caused by the load L. In other words, lowering the stabilisers S into contact with the ground moves the tipping axis forwards, so the machine 1 provides a greater counterbalancing moment and the tipping moment of the load L, load handling implement 11 and load handling apparatus 6, 7 is reduced, resulting in a greater forward stability for a given load weight and location.

For machines 1 of the teachings it is typically not required for there to be further stabilisers adjacent to or rearward of the rear axle. This is because such stabilisers would not offer an appreciable increase in forward stability and there is typically no requirement for rearward stability since the load would not ordinarily placed in a position where it overhangs a rear of the machine.

In other words, an optimal forward stability can be achieved by the front of the machine being supported on the stabiliser(s) S and the rear of the machine is supported on the wheels 5 mounted to axle $A_2$.

If the machine 1 includes one or more stabilisers S, then the controller 12 may be further configured to receive a signal from a stabiliser sensor arrangement 15 (see FIG. 7), the signal being representative of whether or not the or each stabiliser has been deployed. If the or each stabiliser S has been deployed, then the threshold values used by the controller 12 may be different from those which are used without the or each stabiliser S deployed. The controller 12 may include a first set of threshold values for when the or each stabiliser S is not deployed and a second set of threshold values for when the or each stabiliser S is deployed. The threshold values used when the or each stabiliser S is deployed may generally follow the same principles as discussed above for the case when the or each stabiliser S is either not present or not deployed. The description above relating to the threshold value applies equally to the threshold value when the or each stabiliser S is deployed. The threshold values used when the or each stabiliser S is deployed may be higher than the threshold values used for corresponding orientations of the load handling apparatus 6, 7 when the or each stabiliser S is not deployed.

Figure 12:
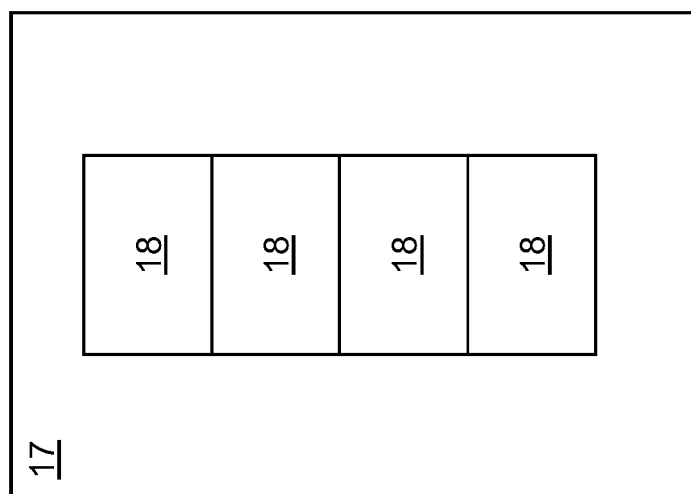
FIG. 12 is a schematic of an indicator.

In an embodiment, an indicator 17 (see FIG. 12) is provided in the cab 3 for the operator. The indicator 17 may be a visual indicator or an audible indicator or both. The indicator 17 preferably includes a plurality of lights 18 (which may be lamps or light emitting diodes—for example). The number of lights 18 which are lit is generally dependent on the signal representative of the moment of tilt as received by the controller 12. Control of the lights 18 may be achieved by the controller 12. In an embodiment, the indicator 17 sounds an alarm and an aspect of the alarm (e.g. pitch or frequency) may vary in general dependence on the signal representative of the moment of tilt as received by the controller 12. In particular, the controller 12 may issue a signal to control the indicator 17. The signal may be the same signal as is issued by the controller 12 to restrict or substantially prevent a movement of the load handling apparatus 6, 7 or may be a further signal. In an embodiment, the indicator 17 receives the signal representative of the moment of tilt as is also received by the controller 12. The controller 12 may issue a signal to the indicator 17 which is used by the indicator 17 to determine the operation of the indicator 17. For example, the controller 12 may issue a scaling factor signal (see below) to the indicator 17 which the indicator 17 may apply to the signal representative of the moment of tilt; the resulting scaled signal may be used to operate the indicator 17.

The lights are, in an embodiment, colour coded—with one or more green lights being lit when that moment of tilt is below the relevant threshold value as determined by the controller 12 and one or more amber or red lights being lit (or flashed) when the relevant threshold value is close or is approaching. An alarm of the indicator 17 may be sounded, in an embodiment, when the relevant threshold is close or approaching. The alarm may be silent when the relevant threshold is not close or approaching.

In accordance with an embodiment, a scaling factor which is dependent on the signal representative of the orientation of the load handling apparatus 6, 7 is applied to the signal representative of the moment of tilt in order to determine the number of lights 18 which are to be lit. This scaling factor may be inversely proportional to the signal representative of the orientation of the load handling apparatus 6, 7. This use of a scaling factor may occur in the controller 12 or in the indicator 17.

Therefore, the moment of tilt which causes the indicator 17 to indicate that the machine 1 is at risk of tipping varies in dependence on the orientation of the load handling apparatus 6, 7.

The dependence on the orientation of the load handling apparatus 6, 7, seeks to ensure that the operation of the indicator 17 can be easily understood by the operator. If the indicator 17 operated solely based on the signal representative of the moment of tilt of the machine 1 then, for example, the number of lights 18 lit when the machine 1 is at risk of tipping would vary. This would be confusing for the operator.

The indicator 17 may take many different forms and need not be a plurality of lights 18 as described above but could be a numerical indicator which displays a numerical value representative of the stability of the machine 1. The indicator 17 also need not be in the cab 3 but may be provided elsewhere in a location in which it can be viewed and/or heard by an operator.

In an embodiment, the indicator 17 includes a light which flashes and/or an alarm that sounds when the controller 12 issues a signal to restrict or substantially prevent a movement of the load handling apparatus 6, 7.

In an embodiment, the indicator 17 is provided and the controller 12 is coupled to the indicator 17. A signal issued by the controller 12 to the indicator 17 controls operation of the indicator 17 and the controller 12 may or may not also be operable to restrict or substantially prevent movement of the load handling apparatus 6, 7.

It will be appreciated that a signal issued by the controller 12 is for use by an element 16 (see FIG. 7) of a machine 1 to control an aspect of an operation of the machine 1 and that two examples of that operation are: restricting or substantially preventing a movement of the load handling apparatus 6, 7; and displaying and/or sounding a warning. Control of other operations is also possible. To this end, the controller 12 may be coupled to an element 16 of the machine which includes, for example, an indicator 17 or a device which restricts or substantially prevents a movement of the load handling apparatus 6, 7 (which might be a movement actuator, a part thereof, or a control element for a movement actuator).

Although the teachings above have been discussed in relation to the lowering of a load from an elevated orientation, the teachings may also be applied in reverse. I.e. it is possible that in extreme conditions of lifting of a load whilst the machine is positioned on a steep upward incline, a sudden cessation of lifting could cause a rearward tipping of the machine about the rear axle $A_2$. The tilt sensing arrangement 13 may be configured to monitor for a rearward moment of tilt 13. In an embodiment, the tilt sensing arrangement 13 includes a strain gauge coupled to an axle $A_1$ of the machine 1 to monitor for rearward tilt. In an embodiment, the tilt sensing arrangement 13 includes a load cell located between the machine body 2 and an axle and configured to sense the load (or weight) on the axle. The tilt sensing arrangement 13 may be coupled to or otherwise associated with the first (or front) axle $A_1$.

In certain embodiments, a relative position of the load handling apparatus with respect to the machine body may also be sensed. This may be achieved by placing a further absolute orientation sensor (e.g. an accelerometer) on the machine body 2 and comparing the values of the two absolute orientation sensors to obtain a relative position. Alternatively, a potentiometer or actuator extension sensor may be used as described above.

The relative position may be utilised to control certain machine interlocks that may be confusing to an operator if they are determined from absolute orientation values. Examples of such interlocks may be for stabiliser isolation, sway isolation of a pivoting axle, and the maximum lift angle of the load handling apparatus before the stabiliser must be deployed. In other embodiments these interlocks may nevertheless be determined by a relative orientation value.

In some embodiments, the controller is additionally or alternatively configured to determine a power capacity of the or each electric energy storage module 34a, 34b.

In such embodiments, the controller is configured to read information indicative of the power capacity of the respective electric energy storage module 34a, 34b when the electric energy storage module 34a, 34b is connected to the machine 1. This may be achieved via any suitable connection arrangement, as will be understood by those skilled in the art. The controller is configured to determine the limits on the operations which the machine is capable of carrying out in view of the available power capacity. Movement of the load handling apparatus 6, 7 can be controlled in a similar manner as detailed above based on these determined limitations. Similarly, the operator display unit can display information relating to these determined limits.

In some embodiments, the controller is additionally or alternatively configured to read information indicative of an amount of charge from the or each electric energy storage module 34a, 34b, when the electric energy storage module 34a, 34b is connected to the machine 1. This may be achieved via any suitable connection arrangement, as will be understood by those skilled in the art. The controller is configured to operate the machine in a first mode, when the amount of charge is above a predetermined amount. The controller is also configured to operate the machine in a second mode, when the amount of charge is below a predetermined amount. For example, the first mode may be normal operation. For example, the second mode may be a low-power mode in which operation of the load handling apparatus is limited.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the teachings in diverse forms thereof. It will be appreciated that numerous changes may be made within the scope of the present teachings.

The invention claimed is:

1. A control system for use with a working machine comprising a machine body, and a load handling apparatus coupled to the machine body and moveable by a movement actuator with respect to the machine body, the working machine being configured for use with at least one electric energy storage module, wherein the control system comprises: a controller, wherein the controller is configured to:
receive or acquire information representative of a weight and/or a position of said electric energy storage module;
determine permitted and/or prohibited operations of the working machine based on the received or acquired information; and
issue an operations signal for use by at least one element of the working machine corresponding to the determined permitted and/or prohibited operations;
wherein the controller includes a machine stabilization decision logic, configured to maintain stability of the working machine, wherein the information representative of the weight and/or the position of the at least one electric energy storage module is an input to the stabilization decision logic, and wherein the determined permitted and/or prohibited operations of the working machine are determined based on the stabilization decision logic; and
wherein an element of the at least one element of the working machine includes the movement actuator, wherein the controller is configured to receive a tilt signal representative of a moment of tilt of the machine, and wherein the controller is configured to issue the operations signal for use by the movement actuator, which in response to the operations signal issued by the controller, is configured to restrict or substantially prevent a movement of the load handling apparatus when a value of the tilt signal reaches a threshold value, the threshold value being dependent on the information representative of the weight and/or the position of the at least one electric energy storage module.

2. The control system in accordance with claim 1, wherein an additional element of the at least one element includes a display to display information corresponding to the determined permitted and/or prohibited operations to an operator.

3. The control system according to claim 1, wherein the controller is configured to receive an orientation signal representative of the orientation of the load handling apparatus with respect to a reference orientation, wherein the threshold value is dependent on the orientation signal.

4. The control system according to claim 3, wherein the threshold value includes a first threshold value associated with one or more predetermined orientations of the load handling apparatus and a second threshold value associated with one or more other predetermined orientations of the load handling apparatus.

5. The control system according to claim 3, wherein the threshold value is proportional or substantially proportional to the signal representative of an orientation of the load handling apparatus over a range of orientations of the load handling apparatus.

6. The control system according to claim 5, wherein the range of orientations of the load handling apparatus is between a first and a second orientation of the load handling apparatus, and at least one different threshold value is used when the position of the load handling apparatus is outside of the range.

7. The control system according to claim 1, wherein the signal representative of the moment of tilt of the machine is a signal representative of the load on an axle of the machine.

8. The control system according to claim 1, wherein the controller is further configured to receive a stabiliser signal representative of whether one or more stabilisers of the machine are deployed, and the threshold value is dependent on the stabiliser signal.

9. The control system according to claim 1, wherein the controller is further configured to receive a signal representative of a position of the load handling apparatus relative to the machine body.

10. The control system according to claim 9, wherein the controller is configured to issue a signal to set an interlock based on the position of the load handling apparatus relative to the machine body.

11. The control system according to claim 1, wherein the working machine is configured to be fitted with one or more ballast modules and wherein the controller is configured to receive or acquire information representative of the weight and/or the position of the one or more ballast modules.

12. The control system according to claim 1, wherein the controller is configured to receive or acquire information representative of the power capacity of the at least one electric energy storage module, and wherein the controller is configured to determine permitted and/or prohibited operations of the machine based on the information representative of the power capacity of the at least one electric energy storage module.

13. A working machine comprising: a machine body, a ground engaging propulsion structure to permit movement of the machine over the ground, a load handling apparatus coupled to the machine body and moveable by a movement actuator with respect to the machine body, and a mount for at least a first electric energy storage module and a second electric energy storage module, the machine being operable with at least one of the first and second electric energy storage modules present, wherein the mount is configured to receive a ballast module in place of the first or second electric energy storage module, wherein the first and/or second electric energy storage modules are configured to be removable from the mount and replaceable, such that the first and/or second electric energy storage modules are interchangeable with the ballast module, and wherein the working machine comprises a first configuration in which the first and second electric energy storage modules are mounted and connected to the working machine to provide power to the working machine, and a second configuration in which the first electric energy storage module is mounted and connected to the working machine to provide power to the working machine and a ballast module is mounted to the working machine in place of the second electric energy storage module.

14. The working machine according to claim 13, wherein the ballast module includes a connector to connect the ballast module to the working machine.

15. The working machine of claim 5, further comprising a control system, the control system comprising a controller configured to receive or acquire information representative of one or more attributes of the ballast module if present.

16. The working machine according to claim 13, wherein the at least one of the first and second electric energy storage modules is selected based on an intended use of the working machine.

17. The working machine according to claim 13, and further comprising a controller configured to:
- receive or acquire information representative of a weight and/or a position of at least one of the first and second electric energy storage module;
- determine permitted and/or prohibited operations of the working machine based on the received or acquired information; and
- issue an operations signal for use by at least one element of the working machine corresponding to the determined permitted and/or prohibited operations;
- wherein the controller includes a machine stabilization decision logic, configured to maintain stability of the working machine, wherein the information representative of the weight and/or the position of the at least one of the first and second electric energy storage modules is an input to the stabilization decision logic, and wherein the determined permitted and/or prohibited operations of the working machine are determined based on the stabilization decision logic; and
- wherein the controller is configured to receive a tilt signal representative of a moment of tilt of the machine, and wherein the controller is configured to issue the operations signal for use by an element of the machine, including the movement actuator, which in response to the operations signal issued by the controller, is configured to restrict or substantially prevent a movement of the load handling apparatus when a value of the tilt signal reaches a threshold value, the threshold value being dependent on the information representative of the weight and/or the position of the at least one of the first and second electric energy storage modules.

18. The working machine according to claim 13, wherein the machine further comprises an operator cab which has a fixed angular orientation with respect to front and/or rear axles of the working machine.

19. The working machine of claim 13, wherein in the second configuration the ballast module does not provide electrical power to the working machine.

20. The working machine of claim 13, wherein the mount is configured to mount the first and/or second electric energy storage modules and/or the ballast module one on top of the other.

21. The working machine of claim 13, wherein each of the first and second electric energy storage modules has a power capacity in the range of 10 to 50 kWh.

22. The working machine of claim 13, wherein each of the first and second electric energy storage modules is between 100 kg and 500 kg in weight.

23. The working machine of claim 13, wherein the machine body comprises an enclosure in which the first and/or second electric energy storage modules and/or ballast module are housed, wherein the enclosure comprises a lid for access to the first and/or second electric energy storage modules and/or ballast module.

24. A control system for use with a working machine comprising a machine body, and a load handling apparatus coupled to the machine body and moveable by a movement actuator with respect to the machine body, the working machine being configured for use with at least one electric energy storage module, wherein the control system comprises:
- a controller, the controller configured to:
- receive or acquire information representative of the position of said electric energy storage module;
- determine permitted and/or prohibited operations of the working machine based on the received or acquired information; and
- issue an operations signal for use by at least one element of the working machine corresponding to the determined permitted and/or prohibited operations;
- wherein the controller includes a machine stabilization decision logic, configured to maintain stability of the working machine, wherein the information representative of the position of the at least one electric energy storage module is an input to the stabilization decision logic, and wherein the determined permitted and/or prohibited operations of the working machine are determined based on the stabilization decision logic.

* * * * *